No. 800,851. PATENTED OCT. 3, 1905.
C. A. JOHNSON.
METAL PUNCHING MACHINE.
APPLICATION FILED JUNE 22, 1904.
13 SHEETS—SHEET 1.
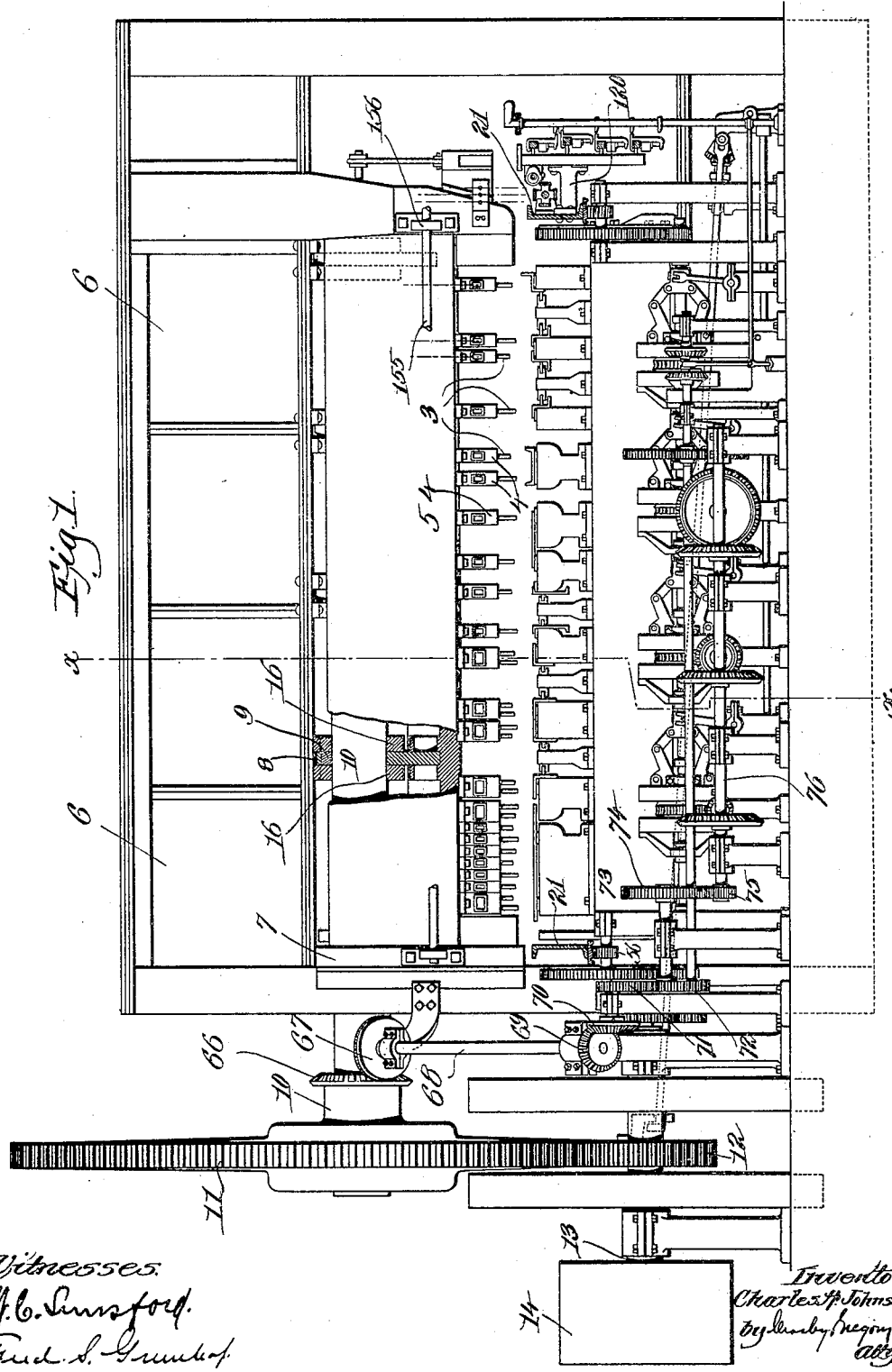

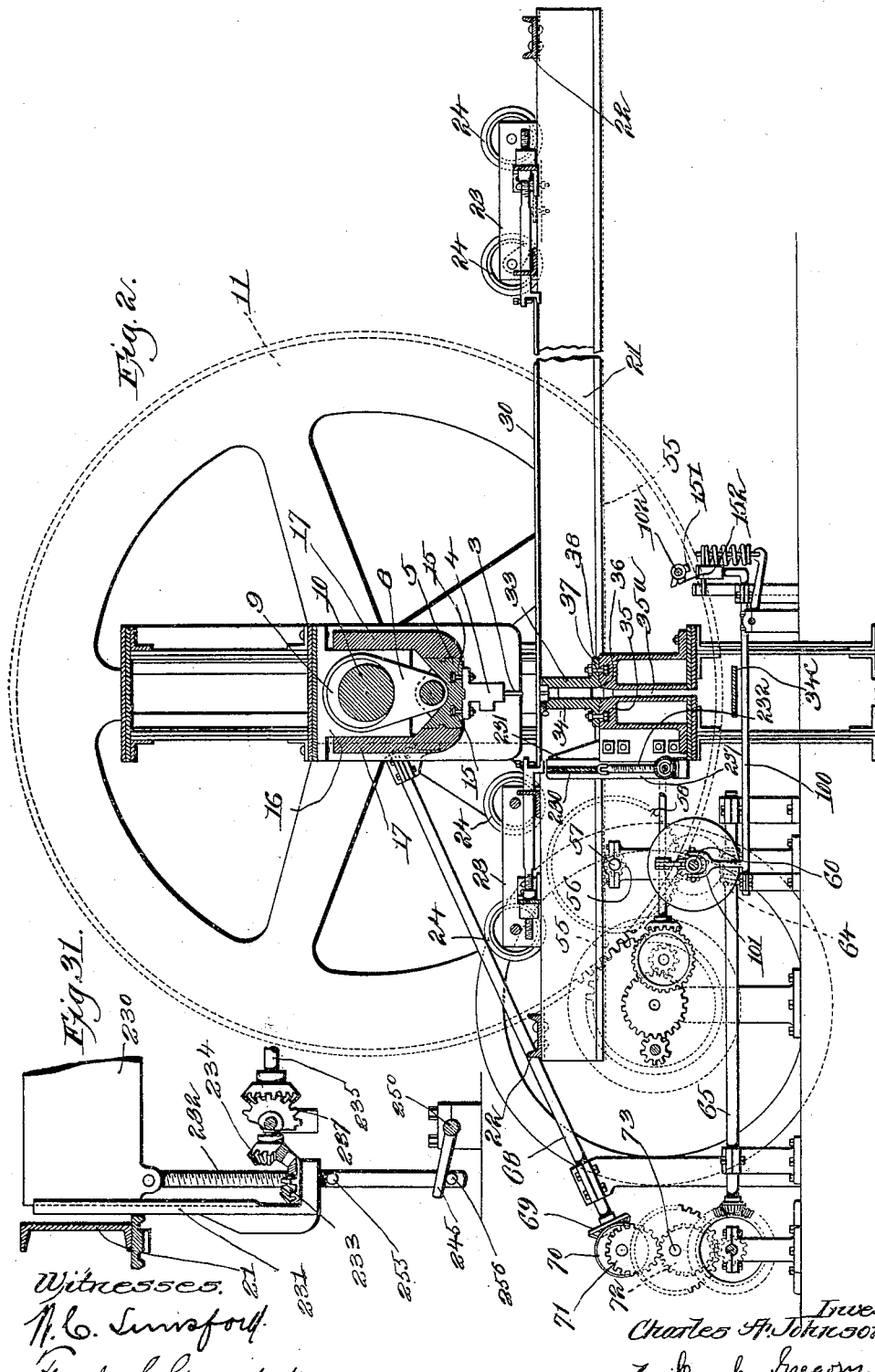

No. 800,851. PATENTED OCT. 3, 1905.
C. A. JOHNSON.
METAL PUNCHING MACHINE.
APPLICATION FILED JUNE 22, 1904.
13 SHEETS—SHEET 3.
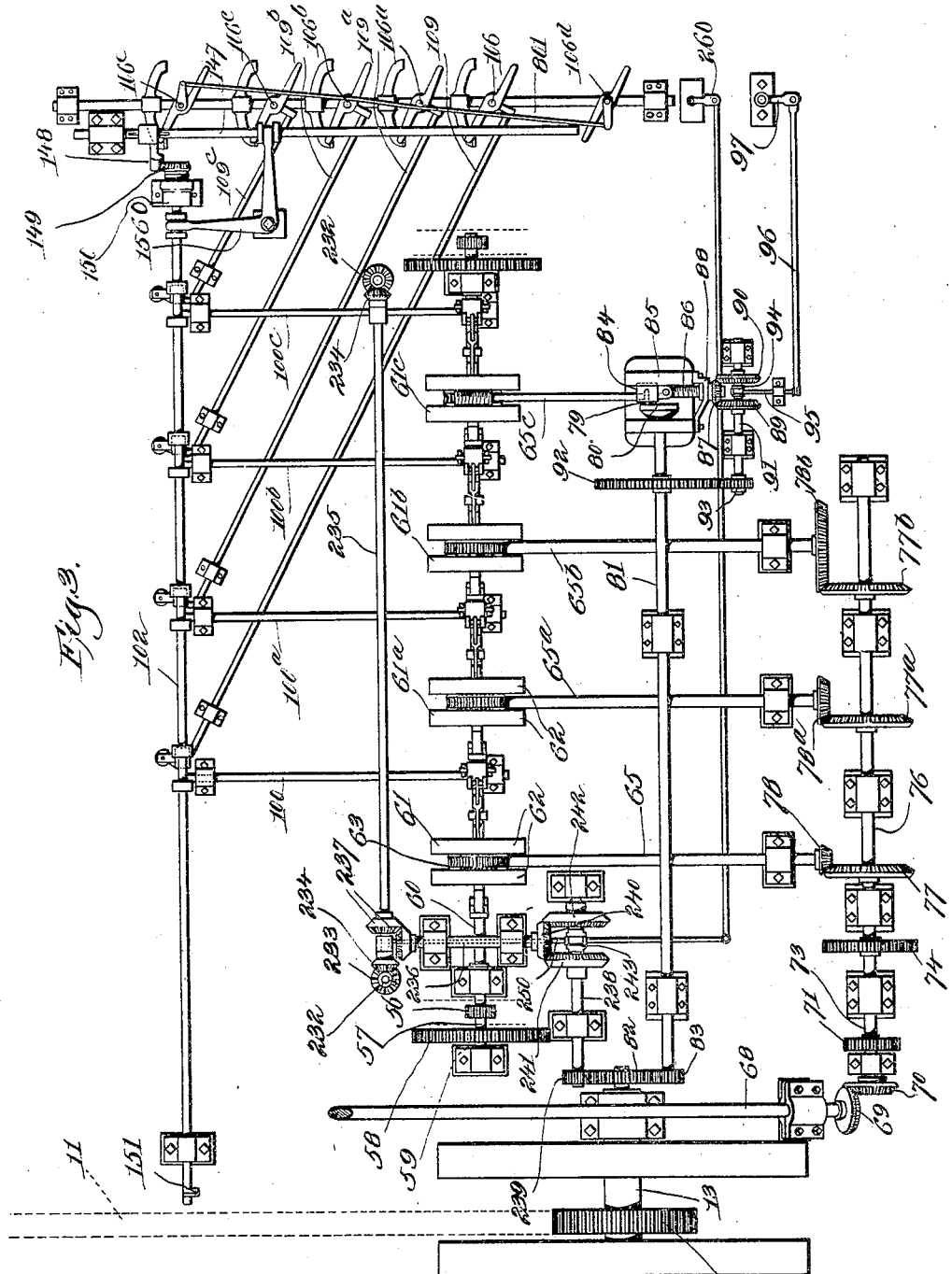
Witnesses.
H. C. Lunsford.
Fred. S. Greenleaf.
Inventor.
Charles A. Johnson,
by Crosby Gregory
atty's.

No. 800,851. PATENTED OCT. 3, 1905.
C. A. JOHNSON.
METAL PUNCHING MACHINE.
APPLICATION FILED JUNE 22, 1904.
13 SHEETS—SHEET 4.
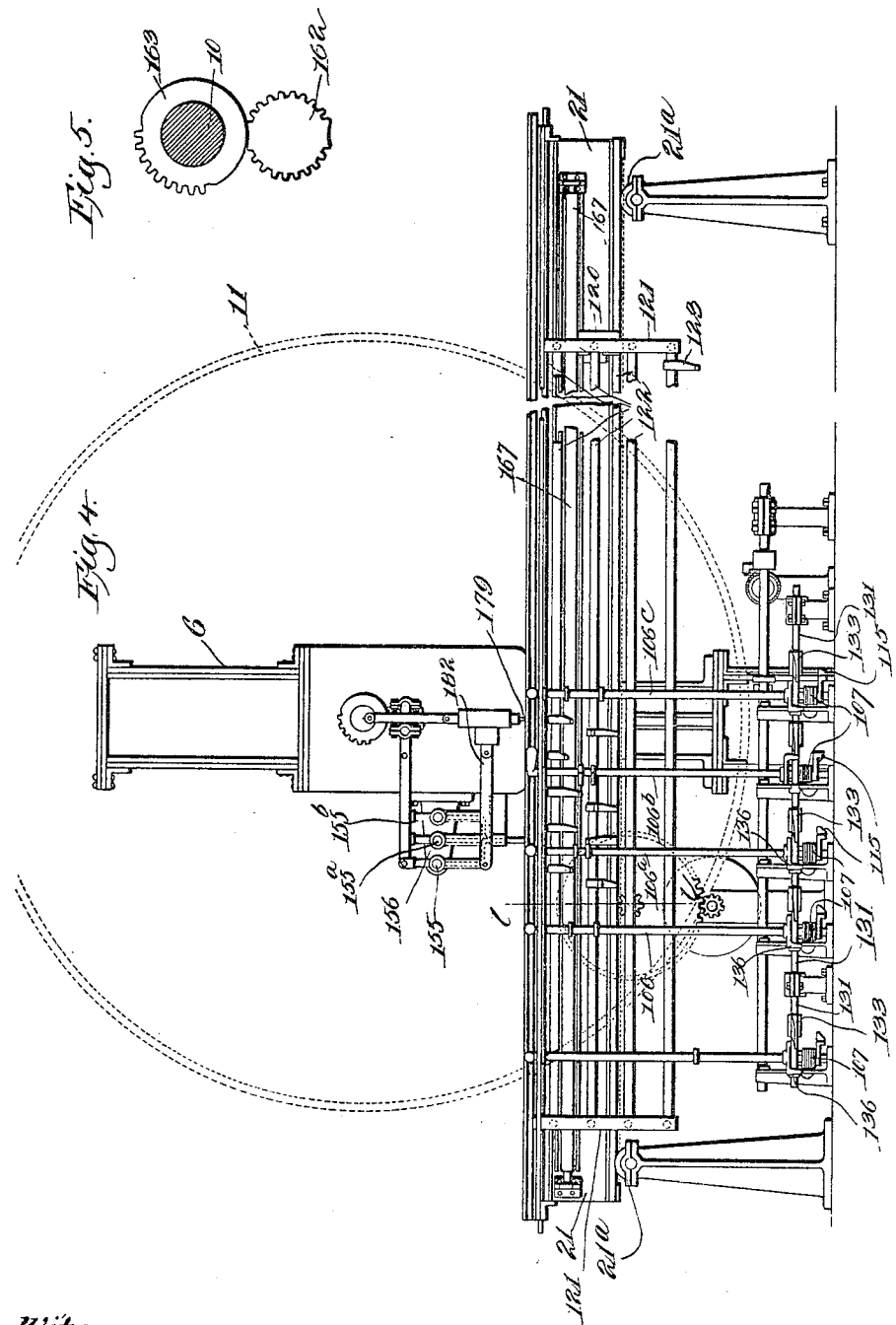

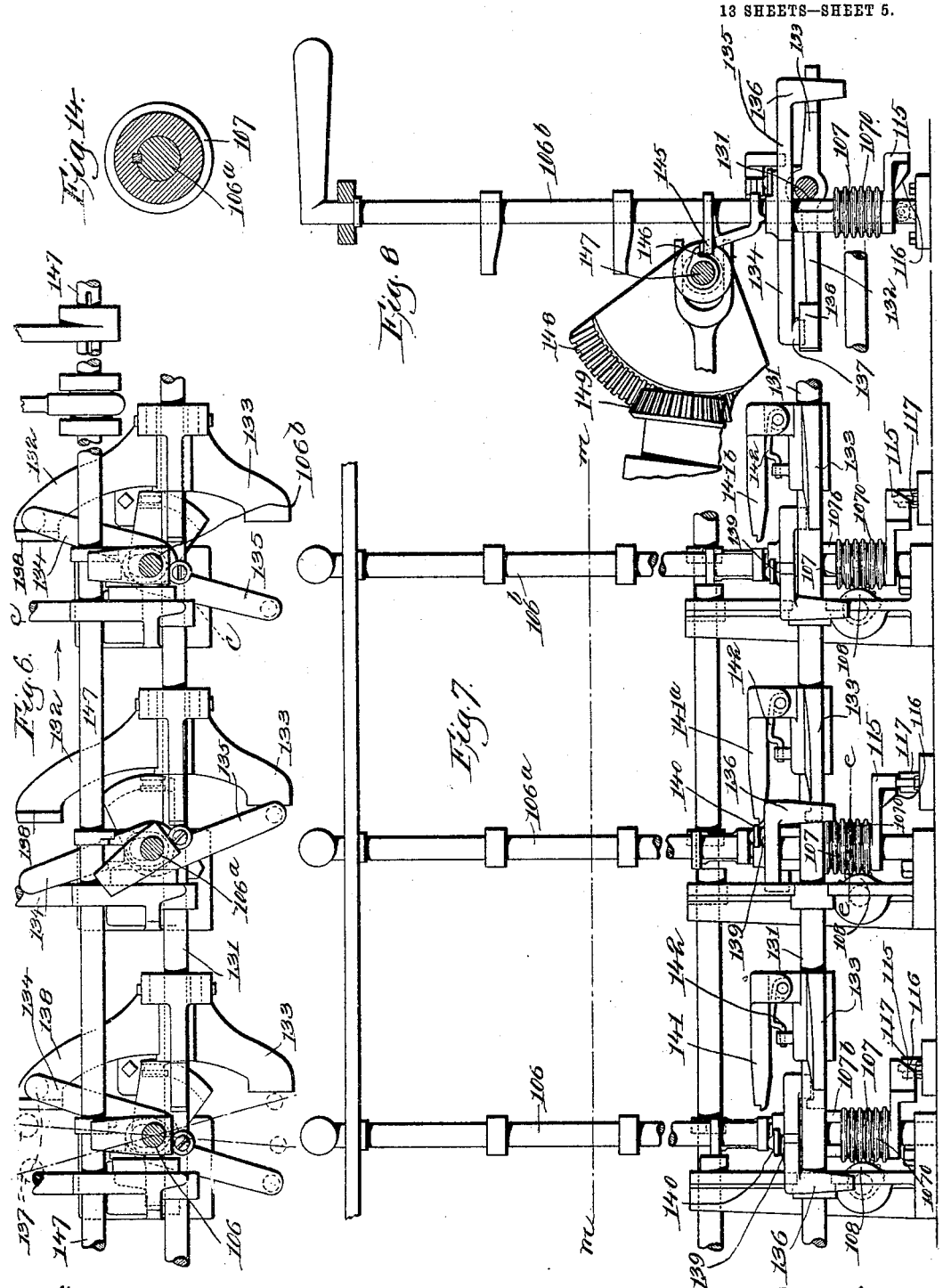

No. 800,851. PATENTED OCT. 3, 1905.
C. A. JOHNSON.
METAL PUNCHING MACHINE.
APPLICATION FILED JUNE 22, 1904.
13 SHEETS—SHEET 6.
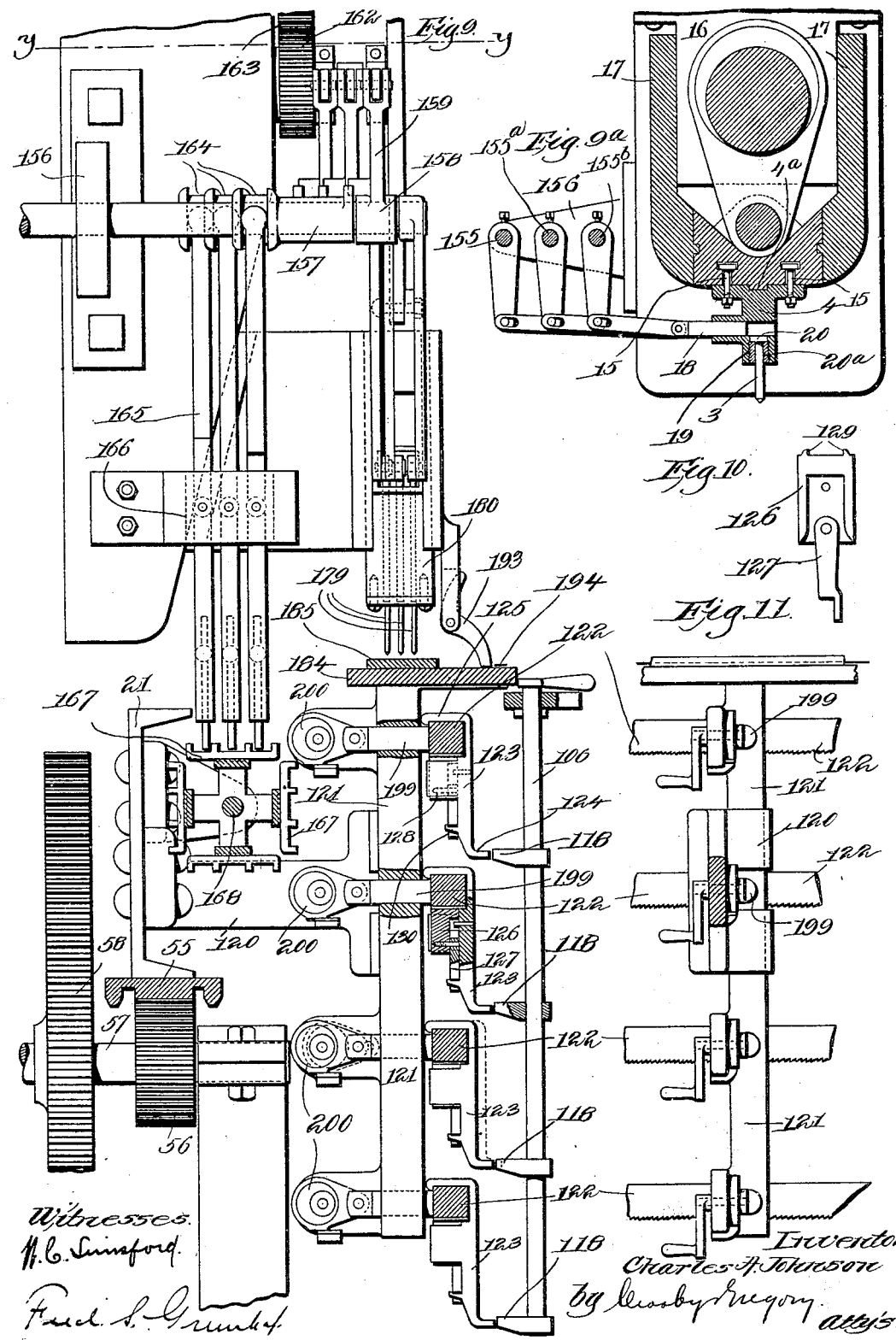
Witnesses.
H. C. Lunsford.
Fred S. Greenlef.
Inventor.
Charles A. Johnson
by Crosby Gregory
attys.

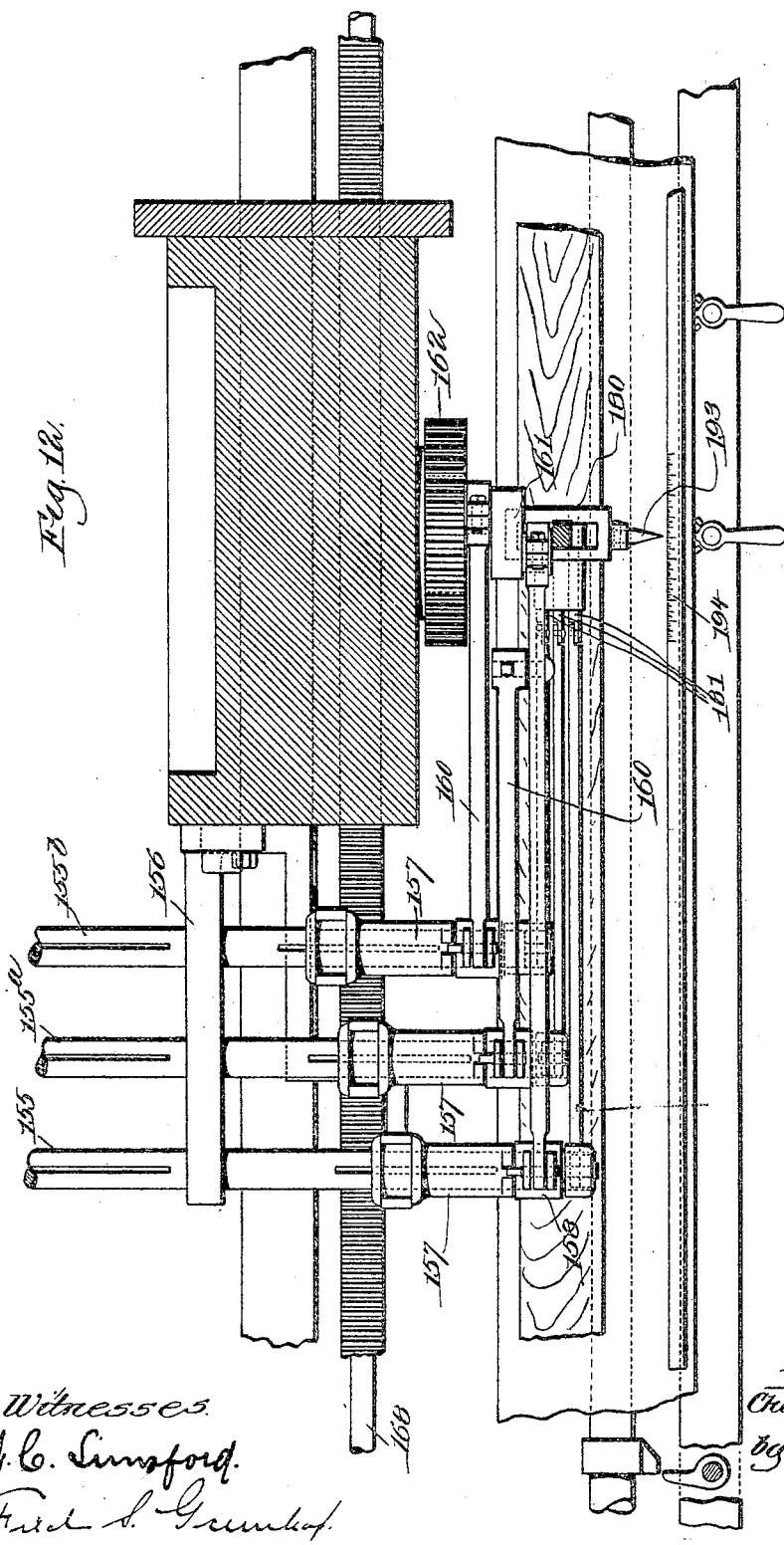

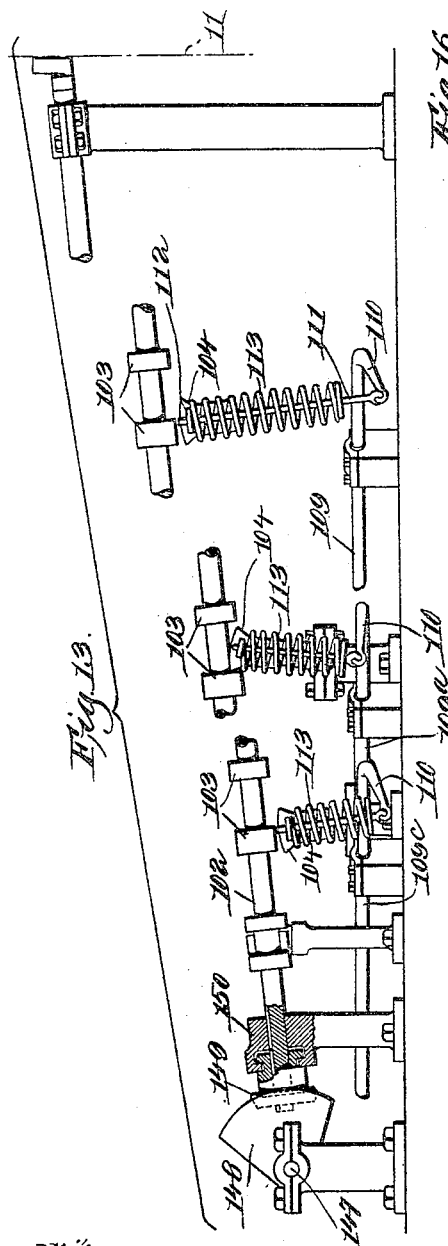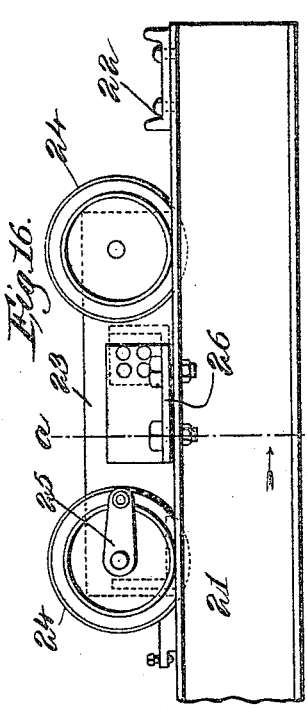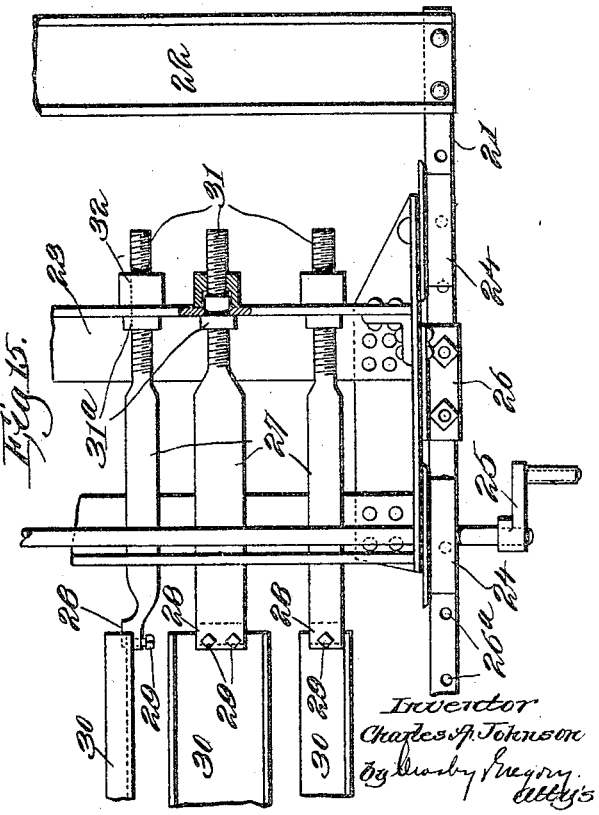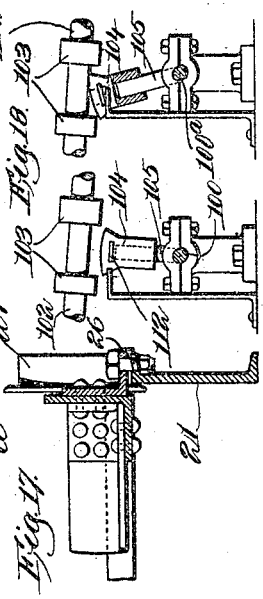

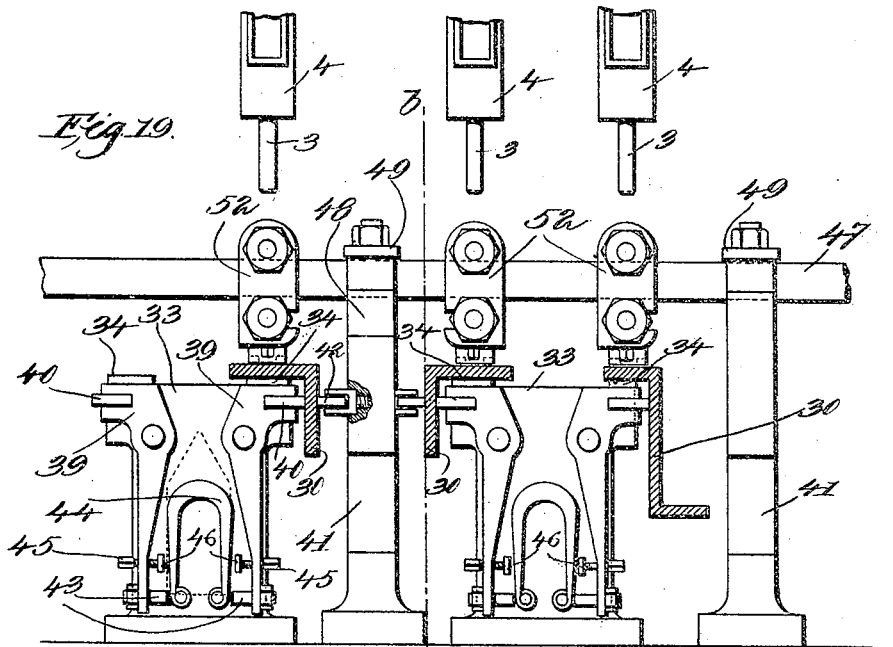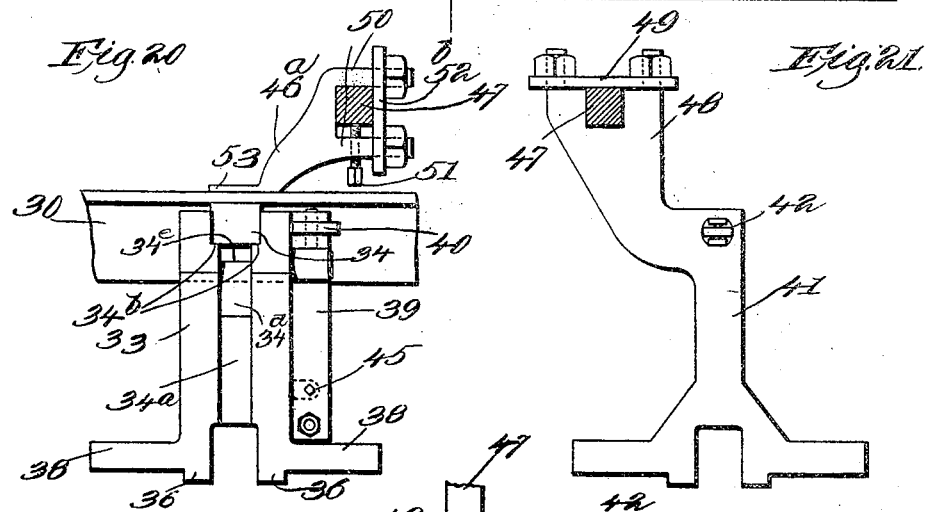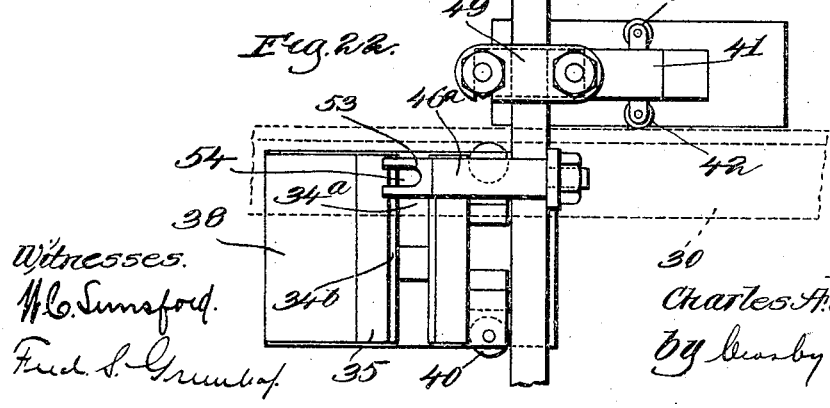

No. 800,851. PATENTED OCT. 3, 1905.
C. A. JOHNSON.
METAL PUNCHING MACHINE.
APPLICATION FILED JUNE 22, 1904.
13 SHEETS—SHEET 10.
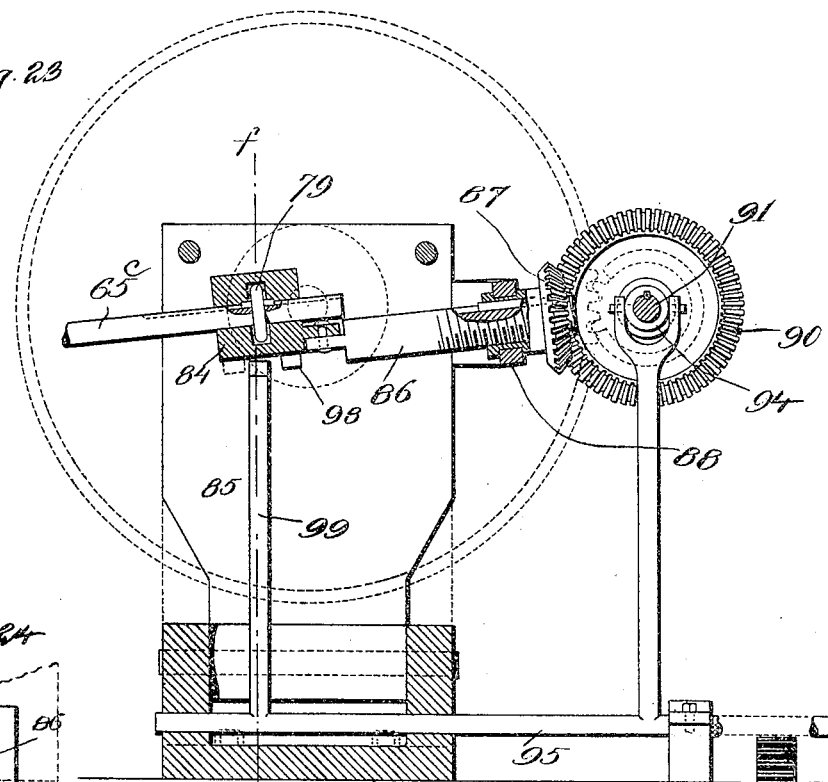
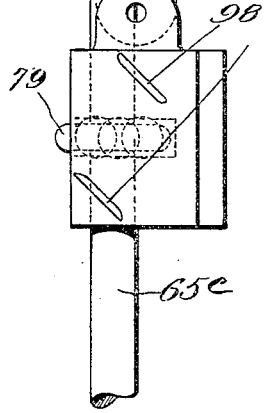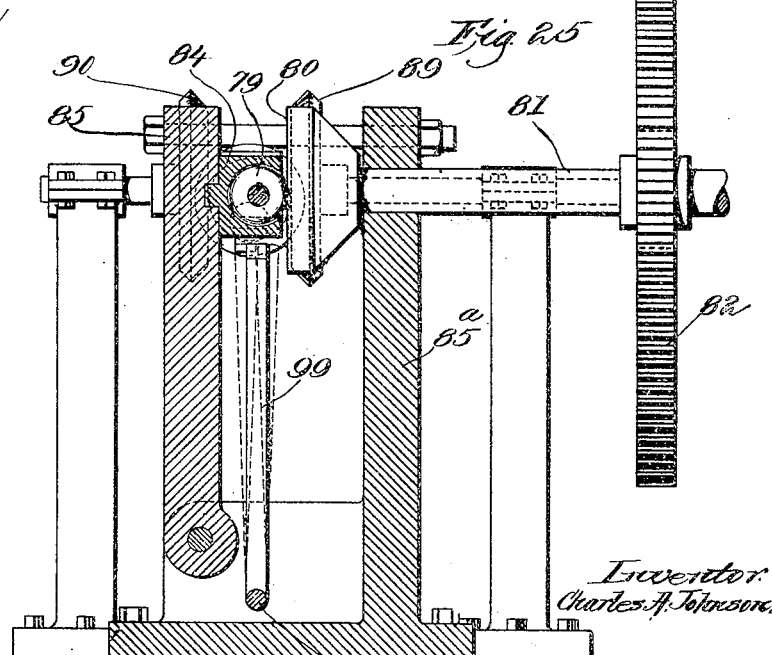
Witnesses.
Inventor:
Charles A. Johnson,
by Crosby Gregory Attys No. 800,851. PATENTED OCT. 3, 1905.
C. A. JOHNSON.
METAL PUNCHING MACHINE.
APPLICATION FILED JUNE 22, 1904.
13 SHEETS—SHEET 11.
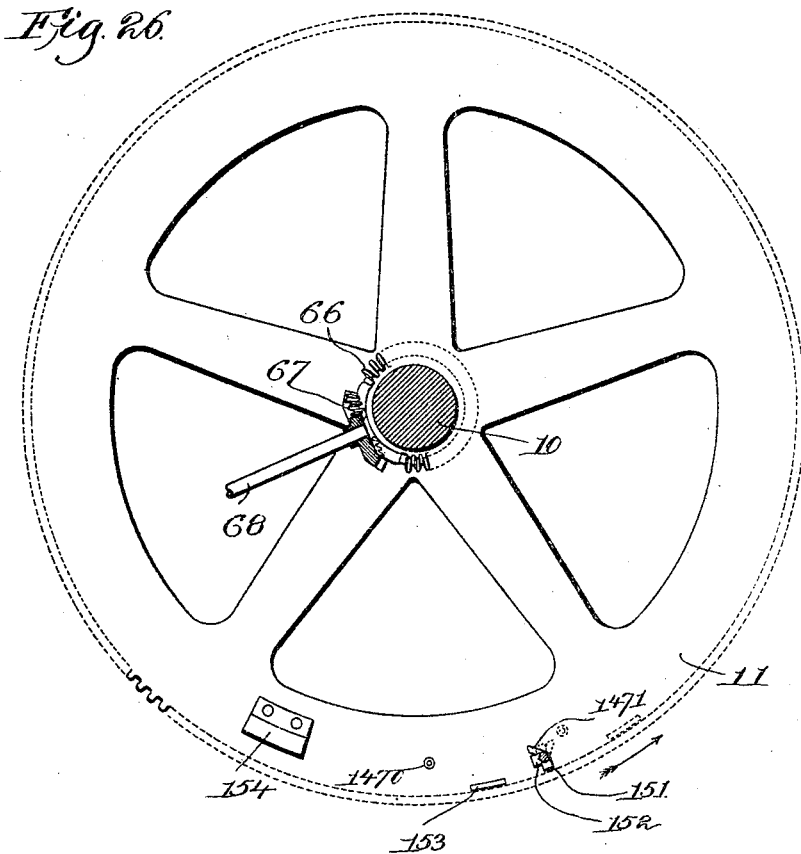
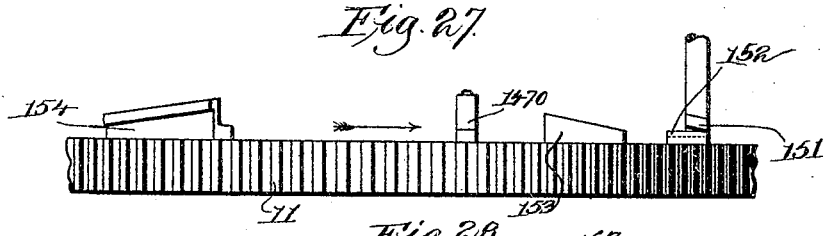
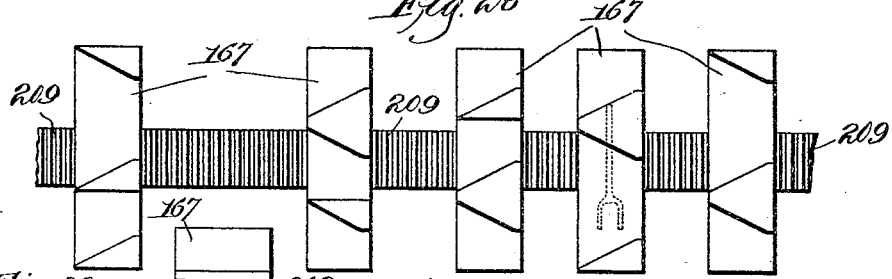

No. 800,851. PATENTED OCT. 3, 1905.
C. A. JOHNSON.
METAL PUNCHING MACHINE.
APPLICATION FILED JUNE 22, 1904.

13 SHEETS—SHEET 12.

Witnesses:
W. C. Lunsford.
Fred. S. Greenhof.

Inventor:
Charles A. Johnson,
By Crosby Gregory,
Atty's.

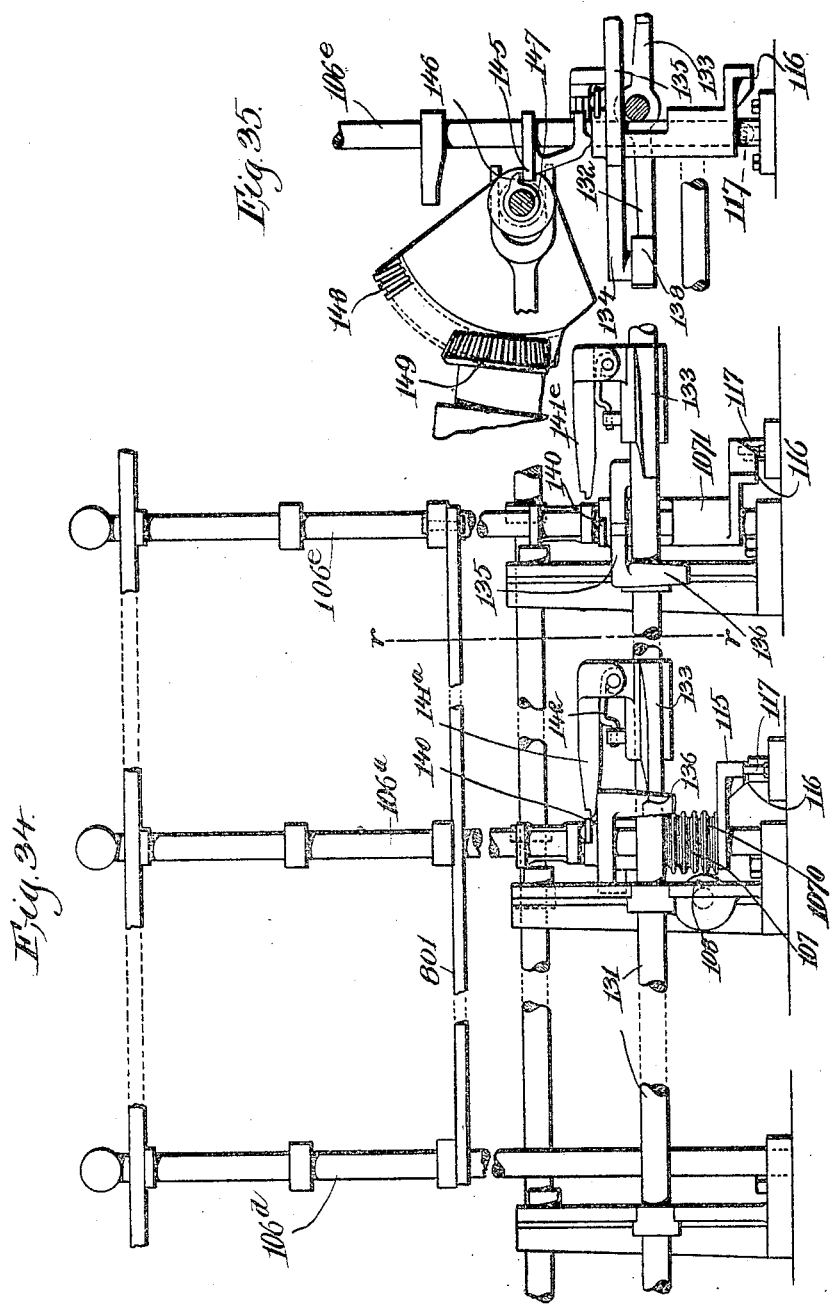

UNITED STATES PATENT OFFICE.

CHARLES A. JOHNSON, OF EVERETT, MASSACHUSETTS.

METAL-PUNCHING MACHINE.

No. 800,851.     Specification of Letters Patent.     Patented Oct. 3, 1905.

Application filed June 22, 1904. Serial No. 213,592.

*To all whom it may concern:*

Be it known that I, CHARLES A. JOHNSON, a citizen of the United States, residing at Everett, in the county of Middlesex and State of Massachusetts, have invented an Improvement in Metal-Punching Machines, of which the following description, in connection with the accompanying drawings, is a specification, like characters on the drawings representing like parts.

This invention relates to metal-punching machines, and has for its object to provide a novel machine for punching a plurality of pieces of metal at one operation.

The device comprises a plurality of punches adapted to act on a plurality of pieces of metal simultaneously, punch-controlling mechanism for controlling the time of operation of the individual punches, and stock-feeding mechanism arranged to feed the stock forward intermittently as the holes are punched.

The punch-controlling mechanism and the stock-feeding mechanism are entirely automatic in their operations so that when the machine is once set it will operate on a plurality of pieces and punch holes in them according to any desired pattern without the necessity of any hand manipulation.

The particular features wherein my invention resides will be more fully hereinafter described, and pointed out in the claims.

Figure 29:
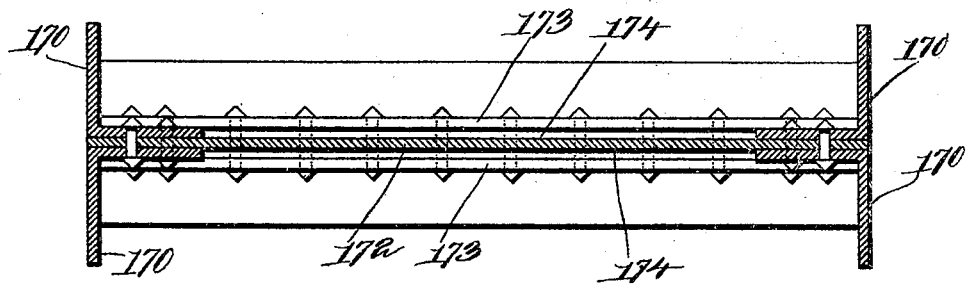
Figure 30:
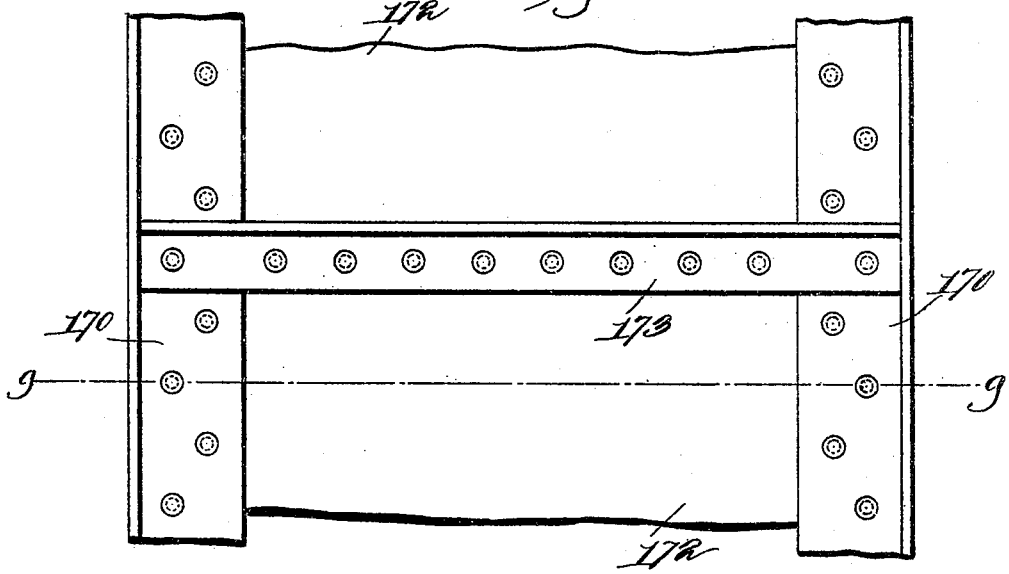

In the drawings, which show one embodiment of my invention, Figure 1 is a front view of the device, the stock-carrier and the feed-controlling mechanism being shown in vertical section for clearness of illustration. Fig. 2 is a longitudinal section on substantially the line *x x*, Fig. 1. Fig. 3 is a plan view of the gearing for operating the feed mechanism. Fig. 4 is a side elevation of my improved machine. Fig. 5 is a detail hereinafter referred to. Fig. 6 is a section on substantially the line *m m*, Fig. 7. Fig. 7 is a detail of the feed-controlling mechanism on an enlarged scale. Fig. 8 is a view of the parts shown in Fig. 7 looking toward the right. Fig. 9 is a section through one side of the machine on substantially the line *l l*, Fig. 4. Fig. 9ᵃ shows the gags for the punches. Fig. 10 is a detail hereinafter described. Fig. 11 is a side elevation of a portion of Fig. 9. Fig. 12 is a section on substantially the line *y y*, Fig. 9. Fig. 13 is a detail of the feed-controlling mechanism. Fig. 14 is a section on line *e e*, Fig. 7. Fig. 15 is a detail of the work-carrier. Fig. 16 is a side elevation of what is shown in Fig. 15. Fig. 17 is a section on the line *a a*, Fig. 16. Fig. 18 shows further details of the feed-controlling mechanism. Fig. 19 shows a front view of the stock holding and stripping mechanism. Figs. 20 and 21 are sections on the line *b b*, Fig. 19, looking in opposite directions. Fig. 22 is a plan view of a portion of Fig. 19. Figs. 23, 24, and 25 are details hereinafter referred to, Fig. 25 being a section on line *f f*, Fig. 23; Fig. 26, a view of the large gear-wheel, showing the means for actuating the clutch-actuator. Fig. 27 is a bottom plan view of a portion of Fig. 26. Fig. 28 is a view of the pattern-cams for the punch-controlling mechanism. Figs. 29 and 30 show one form of girder, (Fig. 29 being a section on line *g g*, Fig. 30,) the separate parts of which are adapted to be simultaneously punched on my machine. Fig. 31 is a detail hereinafter referred to. Figs. 32 and 33 are details hereinafter referred to. Figs. 34 and 35 are details hereinafter referred to.

As stated above, the device comprises a punching mechanism, stock-supporting means, stock-feeding means, pattern-controlled punch-controlling mechanism which determines the particular punches that are rendered operative at any one stroke, and pattern mechanism for the stock-feeding means which automatically controls the amount which the stock is fed forward at each operation.

*Punching mechanism.*—The punches are designated by 3, and each punch is supported in a suitable punch-holder 4, which in turn is secured to and carried by a reciprocating member 5. For convenience I will hereinafter refer to said reciprocating member as the "plunger." This plunger is of a length to support the desired number of punches and reciprocates vertically in a suitable frame 6 of any desired and suitable construction, said frame preferably having guides 7, in which the ends of the plunger travel and by which it is guided. The plunger may be reciprocated in any suitable way, and, as herein shown, it has pivoted thereto a plurality of eccentric-straps 8, which embrace eccentrics 9 on the main shaft 10. This main shaft extends across the frame and is journaled in suitable bearings therein and is rotated in any suitable way. In the present embodiment of my invention said shaft has on one end a large gear-wheel 11, which meshes with and is driven by a smaller wheel 12 on a power-shaft 13, said shaft having a driving-pulley 14 thereon, by means of which it is driven.

The punch-holders 4 are preferably detachably and adjustably secured to the plunger, so that they can be removed therefrom or given any desired position along the length of the plunger. One way of accomplishing this is to form in the bottom of the plunger dovetailed grooves which receive the heads of bolts 15, carried by the punch-holders. By loosening the nuts on said bolts the punch-holders can be shifted to any desired position and locked there by simply tightening the nuts.

On the under side of the plunger is a guiding-rib $4^a$, which extends parallel to the axis of the shaft 10 and which fits a recess in each punch-holder. This guiding-rib preserves the correct alinement of the punch-holders in any adjusted position thereof.

The plunger is guided in its vertical movement by the guides 7 at its ends and also by guide-blocks 16 intermediate its ends. For this purpose the plunger is formed with the vertically-extending side pieces or wings 17, between which the guide-blocks 16 are located, said wings moving up and down on the guide-blocks as the plunger is reciprocated. One or both of these guide-blocks may be removable, if desired, to facilitate the assembling of the parts.

I propose to make the frame 6 of a size to accommodate any desired length of plunger, according to the character of the work which the machine is to perform. In the drawings I have shown a plunger of a length to support twenty or more punches, there being twenty-eight punches shown in the drawings. The size of the frame or length of the plunger, however, constitutes no part of my invention, and these may be varied to suit the exigencies of the case.

Each punch-holder 4 has a vertical opening 19, in which the punch 3 is received, (see Fig. $9^a$,) and is also provided with a movable backing piece or gag 18, which is adapted to be moved in over the end of the punch 3 or withdrawn therefrom, depending on whether said punch is to be active or not.

From the above it will be seen that when the gag is in operative position over the end of the punch the punch will be solidly backed and as the plunger descends will be forced through the material operated upon, while when the gag-strip is withdrawn or in inoperative position the punch will merely recede into the punch-holder upon the descent of the plunger and will not operate on the material.

The backing strips or gags for the respective punches are controlled by suitable pattern mechanism which will be presently described and which operates to select the particular punches upon each descent of the plunger which are to be rendered operative.

The punches are preferably provided with suitable heads 20, which engage the sleeve $20^a$, and thus prevent said punches from falling out of the punch-holders.

*Stock-supporting mechanism.*—The stock, which may be in the form of angle-iron, channel-iron, sheets, or have any other shape, is supported and carried by a suitable stock-carrier comprising two longitudinally-extending beams or members 21, supported on suitable rolls $21^a$, carried by suitable standards. These beams may, if desired, be tied together at their ends, as at 22, and are adapted to move beneath the punching mechanism and advance the stock as the punching proceeds. The stock may be held in position on the stock-carrier in any suitable way. As herein shown, I have provided at each end of the stock-carrier carriages 23, provided with wheels 24, which are adapted to rest on the beams 21 and travel thereon. Figs. 15, 16, and 17 show details of these carriages, from which figures it will be seen that one of the wheels 24 is provided with a crank 25, by means of which the carriage can be adjusted into the desired position. The carriage is fixedly held in its adjusted position by means of flanges 26, rigid with the carriage and overlying the flange and which are adapted to be bolted to the beam 21. The flange of said beam is provided with a plurality of apertures $26^a$, thus permitting the carriage to be locked in any adjusted position. Mounted on the carriage are a series of holding-bars 27, each having jaws 28 at one end to grasp the end of the stock 30 to be punched, one of the jaws of each bar preferably being provided with clamping means, such as a clamping-nut or set-screw 29. These holding-bars are preferably each adjustably mounted on the carriage and for this purpose have the screw-threaded stems 31, which extend through nuts $31^a$, rotatably mounted in one of the cross-bars of the carriage and engaging one side thereof and also through lock-nuts 32. I preferably have one of these carriages at each end of the stock, so that each end of each piece of stock will be grasped by one of the bars 27. The apertures $26^a$ in the flange of the side beams 21 permit me to adjust the carriages approximately the correct distance apart to accommodate any length of stock, and the adjustability of the holding-bars on the carriages furnishes means for giving the exact adjustment desired.

Directly beneath the punches I have placed a series of anvils, which support the portion of the stock on which the punch is operating. These anvils are designated 33 and are each preferably provided with a die member 34, on which the stock rests and which is provided with an aperture in line with the punch and through which the material punched out is forced. The dies are preferably adjustably mounted in the anvils, and for this purpose each anvil is provided with a transverse slot or groove $34^a$, which extends parallel with the plunger and clear through the anvil from top to bottom. The upper end of said slot is widened to form shoulders $34^b$, on which the die or dies rest, said die or dies being flat-sided and of a size to fit the widened portion of the groove. The flat sides of the die prevent it from turning in the groove, while permitting it to be adjusted parallel to the plunger. With this construction it is possible to adjust the dies to correspond with the adjustment of the punches for any desired spacing of the holes. The narrower portion of the slot $34^a$, which extends from the top to the bottom of the anvil, is to permit the escape of the chips or burs, said burs falling through said slots onto a suitable traveling belt $34^c$, located beneath the anvils and extending the full length of the plunger. Extending across the slot $34^a$ of each anvil are one or more bridge-pieces $34^d$, which serve to connect the two parts of the anvil, said bridge-pieces having their upper edges $34^e$ pointed, so that the burs will not accumulate thereon. The anvils 33 are also preferably adjustably supported, so that they can be moved transversely of the stock-carrier to accommodate the position of the stock thereon. These anvils are herein illustrated as being supported on a transverse foundation member 35, which is provided in its upper surface with a transverse groove to receive toes or ribs 36 on the anvils. The latter each are secured in their adjusted position by any suitable means, such as bolts 37, which extend through the feet 38 of the anvils and into dovetailed grooves in the foundation member 35. These grooves permit the lateral adjustment of the anvils. The foundation member is provided with a slot $35^a$, which registers with the slots $34^a$ in the anvils, and the traveling belt $34^c$ runs directly beneath said slot $35^a$.

I preferably provide means for guiding the separate pieces of stock and preventing them from having any lateral movement at the point where the punching operation takes place. To accomplish this, I have illustrated each anvil as provided with swinging jaws 39, carrying rolls 40, which bear against some vertical portion of the stock, as best seen in Fig. 19. Between any two anvils I place an adjustable standard 41, also carrying a roll 42, which is preferably adjustable and between which and the roll 40 the vertical portion of the stock passes. Each jaw 39 is preferably yieldingly held in its operative position, and for this purpose its lower end is connected by a suitable link 43 with a spring 44, which tends normally to force the upper end outwardly against the stock, said spring permitting the roll 45 to yield to accommodate any unevenness in the thickness of the stock. A suitable stop-screw 45, carried by the jaw and adapted to engage a stop 46, fixed to the anvil, serves to limit the outward movement of the jaw. Where each anvil contains two such jaws I make the spring 44 U-shaped, and thus it answers for both of the jaws.

The above-described guiding means prevents the stock from springing laterally during the punching operation and insures the correct alinement of the holes punched therein. This form of guiding mechanism, however, may be changed in many ways or entirely omitted without departing from the invention.

*Stripping mechanism.*—In addition to the means for holding the stock and guiding it, I prefer to employ suitable stripping means, which strips the stock from the punches as the latter are raised. In the present form of my invention such stripping mechanism comprises stripper members $46^a$, which rest on the stock and are adjustably carried by a transverse bar 47, extending across the frame. This bar 47 may be supported in any suitable way, but preferably I provide the standards 41 with suitable extensions 48, in which said stripper-supporting bar 47 is supported. As herein illustrated, the extensions of the standards have open slots in their upper ends in which the bar 47 is received, said slots being covered by a keeper-plate 49, which holds the stripper-supporting bar in place. These strippers are illustrated as having the two jaws 50, between which the stripper-supporting bar 47 is received, a set-screw 51 serving to hold the stripper in adjusted position and a keeper member 52 serving to hold the stripper on the bar. Each stripper is preferably provided with a toe portion 53, which is slotted, as at 54, in line with the corresponding punch, so that as the punch descends it passes through the slot 54 and into the stock. Said strippers, as will be obvious, prevent the stock from rising as the punches are withdrawn. By making them adjustable on the stripper-supporting bar they can be properly positioned to correspond with the position of the punches.

*Stock-feeding means.*—As above described, the stock is carried by a stock-supporting means and is passed over the various anvils and beneath the punches. My improved device is designed to feed the stock forward intermittingly while the plunger is raised, thereby to space the holes in the stock. Said feeding means is constructed to feed the stock-carrier and the stock thereon forward any desired distance during the time that the punches are raised, said distance depending upon the distance desired between the holes in the stock.

The side beams 21 are provided on their lower edges with racks 55, which mesh with pinions 56 on a suitable shaft 57. This shaft 57 carries a gear 58, meshing with a pinion 59 on a clutch-shaft 60. Carried by the clutch-shaft are a plurality of clutches 61 $61^a$ $61^b$ $61^c$, &c., any one of which may be connected thereto by suitable clutch-operating mechanisms hereinafter described. These clutches may be of any suitable or usual construction; but I prefer some familiar or suitable form of friction-clutch.

Inasmuch as the clutch itself forms no part of my invention, I have only illustrated the clutch conventionally. The form of clutch I show has two friction members 62, each splined to the shaft 60, and between them is another friction member 63, which is loose on the shaft and has worm-gear teeth on its periphery. Meshing with the worm on each member 63 is a worm-gear 64, carried by a suitable shaft which is driven from the main shaft 10 through suitable intermediate gearing. The worm-shafts for the various clutches are designated 65 $65^a$ $65^b$, &c. The form of gearing I have herein illustrated for driving the clutch-shaft comprises an intermittent bevel-gear 66, fast on the main shaft 10 and meshing with a suitable intermittent bevel-gear 67 on one end of a shaft 68, the other end of said shaft having another bevel-gear 69, which meshes with a bevel-gear 70. Fast on the same shaft as the gear 70 is one of a pair of coöperating elliptic gears, said gears being designated 71 and 72, respectively. The gear 72 is carried by a shaft 73, having a gear 74 thereon, which in turn meshes with a pinion 75 on a counter-shaft 76. This latter shaft has thereon a plurality of bevel-gears 77 $77^a$ $77^b$, &c., which mesh with other bevel-gears 78 $78^a$ $78^b$, &c., mounted on the shafts 65 $65^a$ $65^c$, &c. With this construction it will be seen that as the main shaft rotates the counter-shaft 76 will be rotated through the gearing above described, and the rotation of the latter shaft will operate the various shafts 65 $65^a$ $65^b$, &c. The speed of the gearing connecting each of the latter shafts with the counter-shaft 76 is different, the gearing between the shafts 65 and the counter-shaft being a low-speed gear, the gearing between the shaft $65^a$ and the counter-shaft being a higher-speed gear and that between the shaft $65^b$ and the counter-shaft a still higher speed gear. The construction is such that during the operation of the machine all of the shafts 65 $65^a$ $65^b$, &c., are continuously rotating, and consequently the clutch members 63 are in motion. Suitable mechanism hereinafter described is employed to throw any one of the clutches desired into operation, according to the speed which it is desired to give to the carrier.

The gearing above described is so arranged that the carrier has an intermittent movement, and preferably a movement at a variable speed. The intermittent movement is given to it in order to permit the stock to be stationary during the time that the punches are operating on the metal and to permit the stock to move forward while the punches are elevated. The varying speed of movement is for the purpose of allowing the carrier and stock which it carries to be started and stopped gradually, thereby relieving the driving mechanism of severe strain.

To get the intermittent movement, I make the gear 66 in the form of a segmental gear or intermittent gear—that is, the teeth are omitted on a portion of its periphery. The size of the gear 67 is such with relation to the number of teeth in the intermittent gear 66 that said gear 67 is rotated once during each revolution of the main shaft 10, said gear 67 remaining at rest during a portion of the rotation of the main shaft, as will be obvious. The intermittent gear 66 is so placed that the gear 67 will remain at rest during the time that the punches are entering or leaving the metal of the stock and will be rotated thereby to advance the carrier and the stock while the punches are clear from the stock.

The varying speed of movement of the carrier is given by the elliptical gears 71 72, these gears being so proportioned and positioned that the shaft 73, and consequently the stock-carrier, will be given a slow movement at the beginning and ending of each forward step and will be given a rapid movement at intermediate points. The result is that the carrier and stock, which obviously will have considerable weight, is started gradually and moves with an increasing speed until it has been given about one-half of its desired movement, when the speed will decrease until it finally stops for another punching operation.

From the above description it will be seen that the distance which the carrier is moved at each step or during each rotation of the main shaft 10 depends upon which particular clutch is thrown in operation. For instance, if the clutch 61 is the active clutch the forward movement of the stock-carrier will be very much less than if the clutch $61^a$ is the active clutch, and the movement when the latter clutch is active is less than when the clutch $61^b$ is the active clutch.

The object in providing a plurality of clutches adapted to give different speeds to the stock-carrier relative to the speed of rotation of the main shaft of the speed of reciprocation of the plunger is to provide for punching the holes in the stock at different distances apart. To illustrate, we will suppose that the gearing of the clutch 61 is such that the stock-carrier will be moved forward a distance of two inches at each rotation of the main shaft and that the gearing $77^a$ $78^a$ is such that when the clutch $61^a$ is in operation the stock-carrier will move four inches at each rotation of the main shaft and the gearing $77^b$ $78^b$ such that when the clutch $61^b$ is in operation the stock-carrier will move eight inches in the same time. If, therefore, it is desired to punch holes two inches apart in the stock, the clutch 61 will be thrown into operation, while if it is desired to punch holes four or eight inches apart the clutch 61ª or 61ᵇ will be thrown into operation.

In the present embodiment of my invention I have only illustrated three different changes of speed; but I wish it understood that my invention is not limited to this number, as any desired number of clutches can be employed, depending upon the spacing desired for the holes in the stock.

For controlling the clutches and determining the times when the different clutches will be thrown into or out of operation I have provided a clutch - controlling mechanism which is entirely automatic in its action and which will be more fully hereinafter described.

In addition to the clutches 61, 61ª, and 61ᵇ I have illustrated another clutch 61ᶜ, which is also thrown into operation by the clutch-controlling mechanism presently to be described. The worm of the clutch 61ᶜ is carried by a shaft 65ᶜ, which has splined thereon a friction-roll 79, coöperating with a friction-disk 80, carried by a suitable shaft 81. The shaft 81 is driven from the power-shaft 13 by suitable gearing 82 83, and therefore said clutch 61ᶜ is driven directly from the power-shaft and not through the main shaft and the intermittent gearing. The end of the shaft 65ᶜ passes through a bearing-block 84, (see Figs. 23, 24, and 25,) which is slidably mounted in the bearing 85, and suitable mechanism is provided for moving said block to carry the friction-roll 79 radially of the friction-disk 80, thereby to vary the speed of operation of the clutch 61ᶜ. As herein shown, said bearing-block has connected thereto a screw-threaded stem 86, which passes through and has screw-threaded connection with a gear 87, mounted in a suitable bearing 88. Said gear 87 can rotate in the bearing 88, but is held from longitudinal movement therein. It meshes with two bevel-gears 89 and 90, loose upon a counter-shaft 91, which is driven from the shaft 81 by suitable gears 92 93.

A suitable clutch mechanism of any approved pattern 94 is constructed to clutch either of the gears 89 or 90 to the shaft 91, depending on whether it is desired to increase or decrease the speed of the clutch. This clutch is operated from a suitable rock-shaft 95 by means of a link 96, leading to a clutch-lever 97, which is preferably placed at the side of the machine within convenient reach of the operator. I have also provided means for automatically disengaging the clutch 94 when the friction-roll approaches the periphery of the friction-disk. For this purpose the bearing-block 84 has on its under side two inclined lugs 98, which coöperate with an arm 99, fast on the rock-shaft 95, to throw the clutch out of operation before the friction-roll moves radially off from the friction-disk.

The above-described clutch mechanism is intended to be used when it is desired to move the carrier considerable distances without punching, as would be the case if the stock to be punched had a space of three or four feet in which no apertures were to be placed. In such event the punch-controlling mechanism hereinafter described would render all of the punches inactive, and the clutch-controlling mechanism, also to be described, would throw the clutch 61ᶜ into operation, thus causing the stock - carrier to advance continuously instead of intermittingly. By means of the friction-roll and friction-disk and the clutch 94 the operator can advance the carrier the desired distance at any appropriate rate of speed, and by merely shifting the friction-roll across the center of the friction-disk the direction of movement of the stock-carrier can be reversed.

*Clutch-controlling mechanism.*—The mechanism I have illustrated for controlling the clutches is entirely automatic in its operation and is governed by suitable pattern mechanism, so that when it is once set it will properly operate the clutches to give the necessary movement to the carriage to obtain any desired arrangement of holes in the stock.

100, 100ª, 100ᵇ, and 100ᶜ designate rock-shafts corresponding to the various clutches, each shaft having a suitable forked arm 101, (see Fig. 2,) which connects with and serves to operate the corresponding clutch, so that the rocking movement of any one of said shafts will throw into or out of operation the corresponding clutch. These shafts are rocked at appropriate times by a suitable actuator 102 in the form of a bar or rod, which actuator is common to all of the rock-shafts. Suitable pattern mechanism is employed to operatively connect at the appropriate times the actuator with the particular rock-shaft which it is desired to turn. The manner of connecting the rock-shafts to the actuator will be best seen from Figs. 3, 13, and 18. The actuator preferably extends transversely of the machine and is provided along its length with pairs of collars 103, which coöperate with suitable heads 104, slidably mounted on arms 105, extending vertically from the various rock-shafts 100 100ª 100ᵇ, &c.

The heads 104 normally stand in their lowered position below the collars 103. The actuator 102 is mounted to have a movement transversely of the machine or longitudinally of its length at suitable intervals; but so long as the heads are in their lowered position such motion of the actuator will not operate the clutches. At appropriate times and as called for by the pattern mechanism the heads 104 of the various rock-shafts are raised into such a position that they will enter between the corresponding pair of collars when the actuator moves longitudinally, as shown in Fig. 13. If now the actuator is moved longitudinally, the raised head will be engaged by the collars and the corresponding rock-shaft will be turned, thus engaging or disengaging the corresponding clutch. The pattern mechanism for thus controlling the action of the various heads will now be described, special reference being made to Figs. 4, 6, 7, 8, and 9.

At the side of the machine and supported in suitable bearings are a plurality of vertical shafts 106 106$^a$ 106$^b$ 106$^c$, &c., each mounted to turn about a vertical axis. At the lower end of each shaft and slidable vertically thereon is a member 1070, having a plurality of annular grooves 107, which grooves mesh with a gear 108 on a cross-shaft, there being as many cross-shafts as there are clutches. These cross-shafts are designated 109 109$^a$ 109$^b$ 109$^c$, &c. These members 1070 are constructed to rotate with the vertical shafts; but they have a vertical movement thereon, as above stated. (See Fig. 3.) Said cross-shafts extend to the actuator 102, and each cross-shaft leads to and coöperates with the head on one of the rock-shafts 100 100$^a$ 100$^b$, &c. In order to avoid confusion, I have used the same exponent for the numerals of the corresponding cross-shaft and rock-shaft—that is, the cross-shaft corresponding to the rock-shaft 100$^a$ is designated 109$^a$, &c. The end of each cross-shaft is provided with the offset portion 110, (see Fig. 13,) to which is connected one end of a link 111, the other end of said link loosely extending through a flange or rib 112, extending from the corresponding head 104. Surrounding each link 111 and bearing against the corresponding flange 112 is a spiral spring 113. With this construction it will be seen that if any one of the cross-shafts 109 109$^a$ is turned the corresponding spring 113 will be compressed and by its action against the flange of the corresponding head said head will be forced up against the actuator. If the actuator is moved longitudinally with the head in this position, said head will snap into the space between a pair of collars 103, and thereafter any longitudinal movement of the actuator will rock the corresponding rock-shaft 100 100$^a$, &c., and thus throw the corresponding clutch.

The necessary turning movement of any cross-shafts 109 109$^a$, &c., is derived by vertical movement of the grooved member 1070 on the corresponding vertical shaft 106 106$^a$, &c., such vertical movement causing the gear 108 to turn because of its meshing with the grooves 107.

The grooved member 1070 on each vertical shaft 106 106$^a$ has rigid therewith a laterally-extending flange 115, (see Fig. 7,) which is provided with a cam-surface 116, coöperating with a roll 117, suitably mounted in stationary bearings. Each vertical shaft also carries one or more laterally-extending fingers 118, which are preferably made adjustable on the shaft. These fingers coöperate with other selector-fingers, which are carried by and move with the stock-carrier, so that as the carrier moves forwardly to advance the stock the finger 118 of one of the vertical shafts 106 is acted upon and said shaft turned, the turning of this shaft, as will be obvious, causing the cam-surface 116 to pass over the roll 117, and thereby forcing the member 1070 vertically. The vertical movement of said member on the shaft, as has been above described, operates through the actuator to throw the corresponding clutch into operation.

The selector mechanism for operating the fingers 118 will now be described.

Extending laterally from one of the side beams 21 of the work-support are one or more brackets 120, (see Figs. 1 and 9,) each having a vertical portion 121. A finger-carrying bar 122 is suitably supported by these brackets 120, and on said finger-carrying bar, which it will be seen extends longitudinally of the stock-carrier and parallel to the beam 21, are a plurality of selector-fingers 123, each of which has a suitable nose 124, which coacts with the fingers 118 on the various vertical shafts. I propose to place the fingers 118 on the various shafts at different elevations, as best seen in Fig. 4, and the selector-fingers 123 are also made of different lengths, so that their noses 124 come in different horizontal planes. The finger 118 on the shaft 106, for instance, will be set so as to be engaged by the nose on one of the selector-fingers, the finger 118 on the shaft 106$^a$ will be set at a different elevation and to correspond with the nose of another selector-finger, and the finger 118 on the shaft 106$^b$ will be set at still another elevation to correspond with still another selector-finger 123, &c. These selector-fingers are properly placed along the length of the bar 122 according to the spacing desired for the apertures in the stock, so that at the appropriate times the finger 118 on the proper vertical shaft will be acted upon by a selector-finger, thereby to throw any particular clutch into or out of operation.

The selector-fingers herein illustrated are each provided with the hooked arm 125, which partially embraces the finger-carrying bar 122, and said fingers are rigidly locked in position on the bar by a locking-block 126, which has a swinging finger 127 and which is adapted to set between flanges 128 on the keeper-fingers and to grip the under side of the bar 122. For this purpose the under side of said bar is preferably serrated, as shown in Fig. 11, and the keeper-block is provided with teeth 129, which engage said serrations, said teeth being held in locking engagement by means of the swinging catch 127, which engages the lug 130 on the finger. This construction provides means for rigidly holding the selector-fingers in any adjusted position on their bar 122.

The operation of the selector mechanism or clutch-operating mechanism as thus far described is as follows: Let us assume that the clutch 61$^a$ is in operation and that the gearing corresponding to such clutch is such as to advance the carrier four inches at each step. With this construction the apertures punched in the stock will be four inches apart. If now the pattern calls for a change from four-inch spacing to two-inch spacing, the selector-finger on the bar 122 corresponding to the finger on the vertical shaft 106 (which, it will be understood, has been previously properly adjusted on said bar) will engage said finger 118 during the forward movement of the stock-carrier and turn the shaft 106 about its axis. Such turning movement causes the cam-surface 116 to ride over the roll 117, and thereby raises said shaft. The vertical movement of said shaft through the gears 107 108 turns the cross-shaft 109, and thus forces the head of the corresponding rock-shaft 100 upwardly against the actuator. At this time the actuator is moved longitudinally by mechanism presently to be described, and such movement rocks the shaft 100 and throws the clutch 61 into operation. At the same time the clutch $61^a$ is thrown out of operation, as will be presently described, and thereafter the mechanism is set so that the stock-carrier moves forward two inches at each rotation of the main shaft.

*Clutch-disengaging mechanism.*—As stated above, I have provided means whereby each clutch is automatically disengaged at the time that another clutch is thrown into operation, and in the preferred form of my invention the disengaging of one clutch is accomplished by the means which throws another clutch into engagement.

Extending longitudinally of the frame and slidably mounted in suitable bearings is a bar or rod 131, (see Figs. 6 and 7,) which has rigid thereto pairs of oppositely-disposed arms 132 and 133, there being as many such pairs as there are vertical shafts 106 $106^a$, &c. Each pair of arms coöperate with another pair of oppositely-disposed arms 134 135, rigidly carried by the grooved member 107o on the corresponding shaft 106 or $106^a$, &c. Each arm 135 has a depending portion 136, which is adapted to engage the end of the corresponding arm 133, and each arm 134 has a nose portion 137, which is adapted to engage a flange or rib 138 on the corresponding arm 132. Extending vertically from each arm 135 is a stud 139 having a projecting flange or shoulder 140, and carried by the rod 131 is a pivotally-mounted spring-pressed pawl 141, which is normally held inactive or in inoperative position by a suitable spring 142. I preferably pivot this pawl 141 to the collar from which the arms 133 132 extend. The normal position of each of the pairs of arms 135 134 when the corresponding clutch 61 $61^a$, &c., is disengaged is in the position of the arms shown on the extreme right or the extreme left of Fig. 6—that is, the nose 137 on the arm 134 is behind the flange 138 and the arm 132. Whenever the clutch is in active position, however, the corresponding vertical shaft 106 $106^a$, &c., stands in such position that its arms 134 135 occupy the position shown in the central portion of Fig. 6—that is, the lug 136 in the arm 135 abuts against the corresponding arm 133 and the arm 134 is separated some distance from the flange 138 of the corresponding arm. The operation of these parts is as follows: Assuming that the respective shafts 106 $106^a$ $106^b$, &c., occupy the positions shown in Figs. 6 and 7, the clutch $61^a$, which corresponds to the vertical shaft $106^a$, will be in operation, while the clutches 61 $61^b$, corresponding to the shafts 106 $106^b$, are thrown out of operation. Going on the assumption above made, the machine will in this position be set for punching holes four inches apart. If it is desired to change this spacing to two inches apart, the appropriate selector-finger 123 engages the finger 118 on the vertical shaft 106 and swings said shaft into the dotted-line position, Fig. 6, thereby throwing the clutch 61 into operation, as above described. Since the nose 137 is in engagement with the flange 138, such turning movement of the shaft 106 will, through its arm 134 and the corresponding arm 132, move the rod or bar 131 to the left, Fig. 6. Such forward movement will bring the pawl $141^a$ into engagement with the lug or stud $140^a$, carried by the shaft $106^a$, it being understood that when said shaft $106^a$ is in the position shown in said figures it is in its elevated position, and therefore the stud is properly situated to be engaged by the pawl $141^a$. The continued forward movement of the bar 131 operates, through the pawl 141 and stud 140, to turn the shaft $106^a$ into its normal position. It will be noted that the radial distance of the stud 140 from the axis of the shaft $106^a$ is very much less than the length of the arms 134 135, and therefore a comparatively slight longitudinal movement of the bar 131 is sufficient to completely return the shaft $106^a$ to its normal position. As said shaft turns the cam-surface 116 will pass off from the roll 117 and the member 107o will be lowered as well as turned, the spring 142 permitting the pawl $141^a$ to follow the downward movement of said member. The parts are so timed that the shaft $106^a$ will be thrown into its normal position by that movement of the bar 131 which is caused by the swinging of the arm 134 from the full-line position, Fig. 6, to a position at right angles to said bar. It will be remembered that as the shaft 106 turns the cam-surface 116 rides over the pulley 117, and thereby raises said member, and the cam is so timed that when the arms 134 135 stand transversely the nose 137 has been carried out of engagement with the flange 138. At the same time the depending portion 136 of the arm 135 comes in contact with the end of the corresponding arm 133 and the further turning movement of the shaft 136 forces the bar 135 backwardly to its full-line position. It will thus be seen that during one half the turning movement of the shaft 136 the bar 131 is moved to the left by the arm 134, and during the other half of said turning movement it is moved to the right back to its original position by the arm 135, and that during its forward, or movement to the left, Fig. 6, it throws the shaft 106ª into its normal position. This clutch-disengaging mechanism is therefore so constructed that the throwing of any one clutch into operation automatically disengages the clutch already in operation.

The shafts 106, 106ª, and 106ᵇ, &c., may be provided at their upper end with handles by means of which they may be manually operated.

When the punching on any length of stock is completed, it is necessary that the active clutch should be thrown out of operation and that no other clutch should be thrown into operation. In order to thus disengage the active clutch without engaging another clutch, I have provided two special vertical shafts 106ᵈ and 106ᵉ, each of which has thereon the adjustable fingers 118, said shafts being shown in detail in Figs. 34 and 35. It will be noted that Fig. 34 is a side view of these two shafts, with the intermediate shafts 106 106ª 106ᵇ, &c., broken out to avoid confusion, and Fig. 35 is a section on the line $r$ $r$, Fig. 34. These shafts are so connected by the link 801 that they will turn in unison but in opposite directions. One of these shafts has thereon a vertically-slidable member 1071, similar to the groove members 1070, above referred to, except that said member 1071 has no grooves 107 therein. The said member 1071 has the cam-surface 116 coöperating with the roll 117, similar to the members 1070. Said member 1071 also has rigid therewith a nose 145, adapted to engage a toe 146 on the shaft 147, so that whenever either one of the vertical shafts 106ᵈ 106ᵉ is turned the shaft 147 and the actuator 102 will also be turned. The member 1071 has the lug 140, with which a pawl 141ᵉ coöperates, said pawl being carried by the yoke from which project the arms 132 and 133 corresponding to said member 1071. The shaft 106ᵈ is for disengaging the clutch and throwing the machine out of operation when the stock-carrier reaches the limit of its movement to the left, Figs. 2 and 4, and the shaft 106ᵉ is for the purpose of throwing the machine out of operation when said stock-carrier reaches the limit of its movement to the right. The operation of these two shafts will be readily understood from the above description, and it will be seen that when either one of them is turned, it operates to advance the rod 131, and thereby disengage the active clutch; but since the vertically-sliding member 1071 does not have any grooves 107 therein and there is no shaft 109 corresponding to said vertical shaft 106ᵈ the turning movement of said latter shaft will not throw any other clutch into operation.

*Actuator-operating mechanism.* — Each shaft 106 106ª 106ᵇ, &c., has a laterally-projecting nose 145, which is adapted to engage a lug or tooth 146, rigid with a shaft 147, extending longitudinally of the machine. On said shaft is a segmental beveled gear 148, meshing with a segmental gear 149, carried by suitable bearings 150. Said gear 149 is splined upon one end of the actuator 102, as best seen in Fig. 13, so that the movement of said gear will oscillate or turn the actuator in its bearings. The actuator extends clear across the machine, as above described, and on its other end it has two laterally-projecting fingers 151 152, which coöperate with suitable cams 153 and 154 on the large gear-wheel 11. (See Figs. 26 and 27.) One of said cams 153 is in the nature of a wedge, which coöperates with the finger 151 to give the actuator a longitudinal movement to the right, Fig. 3, and to the left, Fig. 13, or away from said large gear, and the other cam is in the nature of an overhanging cam-shaped flange, which coöperates with the other finger 152 to move the actuator to the left, Fig. 3.

The normal position of the actuator is that shown in dotted lines, Fig. 26, in which position the finger 151 is out of the path of the wedge-shaped cam 153, and the actuator is moved to its extreme position to the left, Fig. 3, and therefore is not acted upon by the overhanging cam 154. Whenever any one of the selector-fingers engages a finger on the vertical shaft 106, however, and said shaft is turned and the grooved member 1070 is thereby raised by the cam 116, the nose 145 on said shaft engages the tooth 146 and turns the shaft 147, thereby turning the actuator to bring the finger 151 into position to be engaged by the wedge-cam 153. As the large gear-wheel 11 rotates then the actuator is at the proper time moved to the right, Fig. 3, thereby disengaging the clutch already in engagement. As said actuator moves to the right it turns the bell-crank lever 1560, and therefore moves the shaft 147 longitudinally, thus carrying the tooth 146 thereon out of engagement with the nose 145. At this point a finger or projection 1470 on the large gear-wheel 11 engages a projection 1471 on the end of the actuator, thereby turning said actuator to bring the finger 152 into position to be acted upon by the overhanging cam 154, so that during the further continued rotation of the main gear 11 the actuator is returned to its normal position, and thereby causes another clutch to be thrown into engagement.

*Punch-controlling mechanism.* — My machine also includes means for controlling the operation of the various punches — that is, suitable pattern mechanism — which determines which punches shall be active at any downward movement of the plunger. As above stated, each punch-holder 4 is provided with an opening in which plays a suitable gag 18. These gags are controlled by a suitable pattern mechanism, as above described, so that at each downward movement of the plunger the proper gags are thrown in over the corresponding punches, thereby to render such punches operative. Various ways of thus controlling the gags may be employed. In this form of my invention each gag has connected thereto a link which is connected to an arm depending from one of a series of rock-shafts 155, 155$^a$, and 155$^b$, which extend across the machine parallel to the frame 3 and are supported in suitable bearings 156, carried by said frame. With this construction it will be seen that whenever either of the shafts 155 155$^a$ 155$^b$ is rocked the gags which are connected to said shafts will be thrown into their operative position, and consequently the corresponding punches rendered operative. For controlling the times of operation of the shafts 155 155$^a$ 155$^b$ I provide each shaft at one end with a sliding clutch member 157, which is splined to said shaft so that it can move loosely thereon. Coöperating with each clutch member 157 is another clutch member 158, loosely mounted on the corresponding shaft, each member 158 having an arm 159, which is connected, by means of a link 160, with a suitable crank mechanism 161. In the present form of my invention the crank mechanism is a double crank comprising two oppositely-disposed crank-pins, to one of which the link 160, corresponding to the shaft 155, is attached and to the other of which is attached the link 160, corresponding to shaft 155$^b$. The link 160 corresponding to the other shaft 155$^a$ is constructed to be attached to either of the other links, as desired. The crank mechanism 161 has integral therewith a mutilated gear 162, which is operated by another mutilated gear 163, fast on the main shaft 10. The gears 162 and 163 are best shown in Fig. 5. The size of the gear 163 is such with relation to the gear 162 that during each rotation of the main shaft the gear 162 makes a half-revolution, this half-revolution occurring, however, during a small portion of the time of revolution of the main shaft. The crank mechanism therefor has an intermittent movement and remains at rest during the greater portion of the time of rotation of the main shaft. The mutilated gears shown in Fig. 5 are so arranged that the turning movement of the crank mechanism will occur when the plunger is elevated and during the last half of the forward movement of the stock-carrier. Each of the clutch members 157 is provided with a groove 163, in which plays the fork end of a clutch-operating lever 165, said levers all being pivoted in a suitable bracket or support 166, carried by the main frame 3. The lower ends of said levers are actuated at proper intervals by one of a series of pattern-cams 167, carried by a bar mounted on a suitable shaft or support 168, extending the length of the stock-carrier. The pattern-cams 167 are best shown in Figs. 9 and 28, and the pattern-cams are so shaped and positioned that at the appropriate times during the forward movement of the stock-carrier certain of the clutch-levers 165 are turned to throw the corresponding clutches into or out of engagement, depending on which one or ones of the various shafts 155 155$^a$ 155$^b$ it is necessary to rock. To illustrate the operation of this portion of my machine, let us assume that it is punching the elements which together form a girder, such as shown in cross-section in Fig. 29 and in elevation in Fig. 30, said girder comprising the angle-iron side pieces 170, the central web or sheet 172, the angle-iron stiffeners 173, and the filling-pieces 174. In this case the angle-iron side pieces 170 are punched with two rows of holes, the holes of one row having a staggered relation to those of the other. At appropriate intervals in the length of the girder a stiffening member 173 is placed, and the sheet or web 172 has at such intervals a row of holes extending clear across the same and in line with a hole in one of the rows in each side piece. The gags of the punches which make the outside row of holes in each side piece 170 will be connected to the shaft 155, while the gags of the punches for making the other or inside row of holes in each side piece 170 will be connected to the shaft 155$^b$. The gags for the punches of the cross-row in the sheet 172 will all be connected to the shaft 155$^a$, and since this row comes opposite to a hole in the outside row in the side pieces 170 the link for said shaft 155$^a$ will be connected to the link corresponding to the shaft 155. With this hitch-up of the machine and with the proper arrangement of pattern-cams 167 the following operations will take place: During the first step forward of the stock-carrier one of the pattern-cams engages the proper clutch-operating levers 165 to throw the clutches corresponding to the shafts 155 and 155$^b$ into engagement, the clutch corresponding to the shaft 155$^a$ being out of engagement, whereupon during the rotation of the main shaft said rock-shafts 155 and 155$^b$ are rocked alternately and the gags connected thereto, respectively, are moved into and out of their operative position. At the first downward movement of the plunger the gags connected to the shaft 155 are thrown into their operative position, the gags connected to the shaft 155$^b$ being withdrawn at this time, as will be obvious, and therefore the punches for making a hole in the outside row of each side piece 170 and the corresponding holes in the other elements of the girder are rendered operative and said holes all punched. As the plunger rises and the stock-carrier takes its second step forward said gags are withdrawn, and the gags connected to the shaft 155$^b$ are thrown into their operative position, whereby during the next downward movement of the plunger a hole in the second or inside row in each side piece 170 and the corresponding holes in the other elements of the girder are punched. The clutches for the shafts 155 and 155ᵇ are maintained in engagement, and said shafts thus alternately rocked until the stock has advanced into the proper position for punching the cross row of holes for the stiffening-piece 173. When this point is reached, another pattern-cam 167 operates the clutch-operating levers to throw the clutch on the shaft 155ᵃ into engagement. Thereupon the gags corresponding to the punches represented by the cross-row of holes and the corresponding hole in the outside row in the side pieces 170 are thrown into operation and said holes punched. During the next forward movement of the stock-carrier the rocking of the shafts 155 and 155ᵃ will withdraw the gags connected thereto, and during the next succeeding forward movement and while the gags connected to the shaft 155ᵃ are still withdrawn another cam 167 will switch out the clutch on said shaft 155ᵃ, the clutch on shaft 155 remaining in engagement. The machine is now arranged to punch the holes in the side pieces 170, the gags for the punches corresponding to the cross-row of holes remaining out of operation. From this description it will be seen that by properly locating the pattern-cams 167 and making other necessary changes in the device any desired arrangement of holes can be punched with my machine and also that all the holes in the various elements which are to be in alinement and through which a rivet is to be inserted are punched simultaneously.

*Gage for adjusting the mechanism.*—In addition to the features above described I have incorporated in my machine means by which I can test the correctness of the adjustment of the machine before putting it into operation upon pieces of metal. As herein illustrated, this means comprises three testing-punches 179, which are mounted in a suitable punch-holder 180, carried by the frame. Each testing-punch is backed by a suitable gag 181, and these gags are connected to arms 182, rigidly carried by the respective shafts 155, 155ᵃ, and 155ᵇ. Secured to the brackets 121 is a platform 184, on which a strip of wood 185 may be placed, said strip occupying a position directly beneath the testing-punches 179. After the machine has been adjusted the strip of wood 185 is placed in position and the machine set in operation. The test-punches 179 will indent the strip of wood as they are called into operation, and since the gags for said punches are operated by the shafts 155, 155ᵃ, and 155ᵇ it will be apparent that an inspection of the strip of wood 185 after it has been acted on by the testing-punches will show whether the pattern-cams 167 are properly located to bring into action the various shafts 155 155ᵃ 155ᵇ at the proper times.

Carried by the punch-holder 180 is an indicating-finger 193, which coöperates with a suitable tape 194 or with graduation-marks on the platform 184 to indicate the exact position of the stock-carrier. This scale and indicator-finger are of great assistance to the operator in setting up the machine, for it enables him to locate the stock-carrier at any desired position.

I have herein shown four sets of selector-fingers 123 and four sets of pattern-cams 167. The bars 122, to which the sets of selector-fingers are secured, are constructed to be moved toward or from the vertical shafts 106, thereby to bring the selector-fingers into or out of operative position.

In Fig. 9 the bars are all shown as retracted and in their inoperative position. The operative position is shown by the dotted-line position of the second bar from the bottom, and in this position the selector-fingers are located to engage the fingers 118 on the shafts 106.

I preferably employ a plurality of sets of selector-fingers, because thereby the range of the machine is greatly increased. For instance, we will suppose that the selector-fingers on the upper bar 122 are properly arranged to punch according to one pattern and the selector-fingers on the next bar are arranged to punch according to another pattern and so on. After these various sets of selector-fingers have once been adjusted, therefore, it is but the work of an instant to change the machine from one pattern to another, all that is necessary being to withdraw one set of selector-fingers and throw another set into operative position.

The adjustment of the selector-fingers by sets may be accomplished in any suitable way. Herein each bar is shown as having at each end a stem 199, which works through a bracket 121. The ends of the stems are connected to suitable eccentric or cam mechanism 200, by means of which the bars may be thrown in or out. This cam mechanism may be operated in any suitable way, preferably by hand, as shown in Fig. 11.

To avoid the necessity of readjusting the pattern-cams 167 whenever it is desired to change the machine from one pattern to another, I provide a plurality of sets of pattern-cams which are mounted on the shaft 168, as shown best in Fig. 9. By rotating the shaft any one set of pattern-cams may be brought into operative position, as will be obvious.

*Means for alining the stock.*—While the stock is being placed and adjusted on the stock-carrier preparatory to the punching operation, it is desirable that the ends of all of the various pieces of stock should be properly alined. I accomplish this by means of a gate or alining member 230, which is mounted to move vertically in ways 231 just in front of the foundation-casting 35. Said alining member has depending therefrom screw-threaded stems 232, which operate through nuts 233 in the form of gear-wheels, said nuts being mounted in suitable bearings and meshing with gear-wheels 234 on a cross-shaft 235. This latter shaft is operated from a counter-shaft 236 through suitable bevel-gears 237, and the latter shaft is geared to a cross-shaft 238, which has a pinion 239 thereon meshing with the gear 82. (See Fig. 3.)

Suitable means are provided for driving the counter-shaft 236 in either direction, thereby to lower or raise the alining member, as desired. As herein shown, said shaft has the bevel-gear 240, meshing with two bevel-gears 241 and 242 loose upon the shaft 238, each of said gears having thereon clutch projections. Between said gears is a slidable clutch member 243, which is splined to the shaft 238 and which is adapted to engage either one of the bevel-gears 241 and 242. By shifting the clutch 243 in one direction or the other the alining member can be moved up or down, as desired.

I have provided means for automatically throwing the clutch 243 out of engagement when the alining member reaches its upper or its lower position. As herein shown, the clutch 243 is controlled by a rock-shaft 250, which has a forked arm to engage the clutch 243. Said rock-shaft has also projecting therefrom an arm 245, which is adapted to be engaged by projections 255 256 on one of the stems 232, said projections obviously operating to rock the shaft and disengage the clutch when the alining member reaches the limit of its upward or downward movement. A suitable hand-lever 260, situated at the side of the machine, may also be connected to the rock-shaft 250, thus permitting the clutch to be operated by hand.

Although I have described in detail one form of my invention, yet since I believe that I am the first to provide a metal-punching machine in which both the feeding means for the stock-carrier and the punches are controlled by pattern mechanism I desire to claim this broadly. It will be obvious, therefore, that the particular form of pattern mechanism herein shown and the particular devices for throwing the clutches into or out of engagement and other details of the construction may be varied in many ways without departing from the invention.

Having described my invention, what I claim as new, and desire to secure by Letters Patent, is—

1. In a punching-machine, a stock-carrier, means to feed the same forward, a plurality of punches and pattern mechanism for controlling the operation of the punches, said pattern mechanism including a plurality of pattern-cams carried by the stock-carrier.

2. In a punching-machine, a stock-carrier, means to feed the same forward, a plurality of punches, a gag for each punch and pattern mechanism for controlling the operation of the gags, said pattern mechanism including a plurality of cams carried by the stock-carrier.

3. In a punching-machine, a stock-carrier, means to feed the same forward, a plurality of punches, a gag for each punch and gag-operating mechanism including actuating-levers, and pattern-cams carried by the stock-carrier to actuate the levers.

4. In a punching-machine, a stock-carrier, means to feed the same forward, a plurality of punches and pattern mechanism for controlling the operation of the punches, said pattern mechanism including a plurality of adjustable pattern-cams carried by the stock-carrier.

5. In a punching-machine, a stock-carrier, means to feed the same forward, a plurality of punches, a plurality of sets of pattern devices carried by the stock-carrier for controlling the operation of the punches, and means whereby either set of pattern devices may be brought into operative position.

6. In a punching-machine, a stock-carrier, means to feed the same forward, a plurality of punches, and means for operating said punches, said means including a plurality of sets of pattern-cams carried by the stock-carrier, any one set of which may be brought into operative position.

7. In a punching-machine, a pattern-controlled stock-carrier and a plurality of pattern-controlled punches.

8. In a punching-machine, a plurality of punches, pattern-controlled gags for the punches, and pattern-controlled stock-feeding means.

9. In a punching-machine, a pattern-controlled stock-carrier, a plurality of punches, and punch-controlling means rendered operative by the movement of the stock-carrier.

10. In a punching-machine, a stock-carrier, means to feed the same forward, a plurality of punches, gags for the punches, and pattern-controlled gag-operating mechanism including pattern-cams carried by the stock-carrier.

11. In a punching-machine, a stock-carrier, means to feed the same forward, a plurality of punches, gags for the punches, and pattern-controlled gag-operating mechanism including adjustable pattern-cams carried by the stock-carrier.

12. In a punching-machine, a punch, and pattern-controlled means to feed the stock forward.

13. In a punching-machine, a punch, and pattern-controlled means to feed the stock forward intermittently.

14. In a punching-machine, punching mechanism, a movable stock-carrier on which rests the stock to be punched and by which said stock is entirely supported, and variable-speed feeding means for said stock-carrier.

15. In a punching-machine, punching mechanism, means to feed the stock forward, said means including pattern mechanism to control the speed at which the stock is fed.

16. In a punching-machine, punching mechanism having a uniform speed of operation, and stock-feeding means including pattern mechanism to control the relative speed of movement between the punching mechanism and the stock.

17. In a punching-machine, punching mechanism, and means to feed the stock forward, said means including a pattern-controlled speed-changing device.

18. In a punching-machine, punching mechanism, a stock-carrier, and means to move the same forward, said means including a plurality of clutches adapted to drive the stock-carrier at different speeds.

19. In a punching-machine, punching mechanism, a stock-carrier, and means to move the same forward, said means including a plurality of pattern-controlled clutches adapted to drive the stock-carrier at different speeds.

20. In a punching-machine, punching mechanism, a stock-carrier, and means to move the same forward, said means including a plurality of clutches, and pattern mechanism to control the times when each clutch shall be engaged or disengaged.

21. In a punching-machine, punching mechanism, a stock-carrier, means to feed said stock-carrier forward, said means including a plurality of clutches, and an actuator to engage and disengage said clutches.

22. In a punching-machine, punching mechanism, a stock-carrier, means to feed said stock-carrier forward, said means including a plurality of clutches and an actuator to engage and disengage said clutches, and pattern mechanism to connect each clutch with the actuator at the appropriate time.

23. In a punching-machine, a main shaft, punches operated thereby, a stock-carrier, means to feed said stock-carrier forward, said means including a plurality of clutches, an actuator operated by the main shaft, and automatic means to connect each clutch to the actuator at the appropriate time.

24. In a punching-machine, a main shaft, punches operated thereby, a stock-carrier, and means to feed said stock-carrier forward, said means including a plurality of clutches, a pattern-controlled actuator to engage and disengage said clutches, and pattern mechanism to connect each clutch to the actuator at the appropriate time.

25. In a punching-machine, punching mechanism, a stock-carrier, means to feed the same forward, and adjustable pattern mechanism to control the speed at which said stock-carrier is fed.

26. In a punching-machine, punching mechanism, a stock-carrier, means to feed the same forward, said means including a plurality of clutches, and adjustable pattern mechanism for controlling the clutches.

27. In a punching-machine, a pattern-controlled stock-carrier, and a pattern-controlled punching mechanism.

28. In a punching-machine, punching mechanism including punches, and pattern-controlled gags therefor, combined with pattern-controlled stock-feeding means.

29. In a punching-machine, punching mechanism including punches and pattern-controlled gags therefor, combined with a stock-carrier, means to move the same forward intermittently, and pattern-controlled mechanism to control the distance it is fed at each step.

30. In a punching-machine, punching mechanism including punches and pattern-controlled gags therefor, combined with a stock-carrier, means to move the same forward, said means including an automatic speed-changing device.

31. In a punching-machine, punching mechanism including punches, automatically-operated gags therefor, combined with a stock-carrier, and means to feed the same forward, said means including a plurality of clutches adapted to drive the stock-carrier at different speeds.

32. In a punching-machine, punching mechanism including punches, automatically-operated gags therefor, combined with a stock-carrier, and means to feed the same forward, said means including a plurality of automatically-operated clutches adapted to drive the stock-carrier at different speeds.

33. In a punching-machine, punching mechanism including punches, automatically-operated gags therefor, combined with a stock-carrier, and means to feed the same forward, said means including a plurality of clutches, and an automatically-operated actuator to engage and disengage the clutches.

34. In a punching-machine, punching mechanism, a stock-carrier comprising side beams, and carriages on said beams, said carriages having means to grip the stock.

35. In a punching-machine, punching mechanism, a stock-carrier comprising side beams, carriages on said beams, said carriages having means to grip the stock, means to lock the carriages to the beams, and means to feed the stock-carrier forward.

36. In a punching-machine, a plurality of sets of punches, a gag for each punch, gag-operating mechanism including a rock-shaft for each set of punches, means connecting each rock-shaft to the gags of the corresponding set, and means to operate said shafts.

37. In a punching-machine, a plurality of sets of punches, a gag for each punch, and means to operate simultaneously the gags for all the punches of each set.

38. In a punching-machine, a plurality of sets of punches, a gag for each punch, and pattern mechanism to operate simultaneously all the gags for each set of punches.

39. In a punching-machine, a plunger carrying punches, gags for the punches, gag-operating mechanism comprising a plurality of rock-shafts to which the gags are connected, and means to oscillate said rock-shafts, said means including a pattern-controlled clutch for each shaft.

40. In a punching-machine, a plunger carrying punches, gags for the punches, gag-operating mechanism comprising a plurality of rock-shafts to which the gags are connected, and means to oscillate said rock-shafts, said means including a clutch for each shaft, and automatic means to control the operation of the clutches.

41. In a punching-machine, punching mechanism, a stock-carrier, and pattern-controlled means to feed the stock-carrier forward intermittently, said means operating to give the stock-carrier a varied speed at each step.

42. In a punching-machine, punching mechanism, a stock-carrier, and pattern-controlled means to feed the stock-carrier forward intermittently, said means operating to give the stock-carrier an increasing speed during the first half of each forward movement, and a decreasing speed during the latter half thereof.

43. In a punching-machine, punching mechanism, a stock-carrier, and pattern-controlled means to feed the stock-carrier forward intermittently, said means including elliptical gears.

44. In a punching-machine, punching mechanism, a stock-carrier on which the stock to be punched rests and by which it is supported, means to feed said stock-carrier forward intermittently, and automatic means to vary the distance said stock is fed forward at each step.

45. In a punching-machine, punching mechanism, a stock-carrier, means to feed said stock-carrier forward intermittently, and pattern mechanism to control the distance which the stock-carrier is fed forward at each step.

46. In a punching-machine, punching mechanism, a stock-carrier, pattern-controlled means to feed the latter forward intermittently, said means operating to give a varying speed at each step, and means to control the distance which said carrier moves at each step.

47. In a punching-machine, punching mechanism, a stock-carrier, means to feed the latter forward intermittently, said means operating to give a varying speed at each step, and automatic means to vary the distance which said carrier moves at each step.

48. In a punching-machine, punching mechanism, a stock-carrier, means to feed the latter forward intermittingly, and means to vary the speed at which said stock-carrier moves during the various steps in its movement.

49. In a punching-machine, punching mechanism, a stock-carrier, means to move the latter forward with a step-by-step movement, and automatic means to give said carrier a different speed of movement during one step than during another.

50. In a punching-machine, punching mechanism, a stock-carrier, means to feed the latter forward with a step-by-step movement, said means including mechanism to move the carrier a greater distance during one step than during another.

51. In a punching-machine, punching mechanism, a stock-carrier, means to feed the stock-carrier forward intermittently, said means including a plurality of clutches each adapted to drive the stock-carrier at a different speed, and pattern mechanism to control the time when each clutch shall be engaged or disengaged.

52. In a punching-machine, punching mechanism, a stock-carrier, means to feed the latter forward intermittently and with a varying speed at each step, said means including a plurality of clutches each adapted to drive the stock-carrier at a different speed, and pattern mechanism to control the time when each clutch shall be thrown into or out of engagement.

53. In a punching-machine, punching mechanism, a stock-carrier, means to feed said stock-carrier forward intermittently, said means including a plurality of clutches, an actuator to throw said clutches into and out of operation, and automatic means to connect each clutch to the actuator at the appropriate time.

54. In a punching-machine, punching mechanism, a stock-carrier, means to feed said stock-carrier forward intermittently and with a varying speed of movement at each step, said means including a plurality of clutches, an actuator to throw said clutches into and out of operation, and automatic means to connect each clutch to the actuator at the appropriate time.

55. In a punching-machine, punching mechanism, a stock-carrier, means including a plurality of clutches to feed said stock-carrier forward, and a similar number of operating-shafts to throw the clutches into and out of engagement.

56. In a punching-machine, punching mechanism, a stock-carrier, means including a plurality of clutches to feed said stock-carrier forward, a similar number of operating-shafts to throw the clutches into and out of engagement, and automatic means to operate said shafts.

57. In a punching-machine, punching mechanism, a stock-carrier, means including a plurality of clutches to feed said stock-carrier forward, and a similar number of operating-shafts to throw the clutches into and out of engagement, and means to operate each shaft at the appropriate time by or through the movement of the stock-carrier.

58. In a punching-machine, punching mechanism, a stock-carrier, means including a plurality of clutches to feed said stock-carrier forward, a similar number of operating-shafts to throw the clutches into and out of engagement, and selector-fingers carried by the stock-carrier to engage and operate the shafts.

59. In a punching-machine, punching mechanism, a stock-carrier, means including a plurality of clutches to feed said stock-carrier forward, a similar number of operating-shafts to throw the clutches into and out of engagement, fingers carried by the shafts, and selector-fingers carried by the stock-carrier and adapted to engage the fingers on the shafts and thus operate the latter.

60. In a punching-machine, punching mechanism, a stock-carrier, means including a plurality of clutches to feed said stock-carrier forward, a similar number of operating-shafts, means to turn each shaft to throw the corresponding clutch into engagement, and means whereby the throwing of any clutch into engagement throws the already-operating clutch out of engagement.

61. In a punching-machine, punching mechanism, a stock-carrier, means including a plurality of clutches to feed said stock-carrier forward, a similar number of operating-shafts for throwing the clutches into engagement, means to operate each shaft at the appropriate time by or through the movement of the stock-carrier, and means whereby the throwing of any clutch into engagement throws the already-operating clutch out of engagement.

62. In a punching-machine, punching mechanism, a stock-carrier, means including a plurality of clutches to feed said stock-carrier forward, a similar number of operating-shafts, fingers on each shaft, selector-fingers carried by the stock-carrier and adapted to engage the fingers on the shafts thereby to turn the latter and throw the clutches into operation, and means whereby the throwing of any clutch into operation throws the already-operating clutch out of operation.

63. In a punching-machine, punching mechanism, a stock-carrier, means including a plurality of clutches to feed said stock-carrier forward, a similar number of operating-shafts, and means whereby the turning of any shaft throws the corresponding clutch into operation, and the already-operating clutch out of operation.

64. In a punching-machine, punching mechanism, a stock-carrier, means including a plurality of clutches to feed said stock-carrier forward, a similar number of operating-shafts, and means whereby the turning of any shaft throws the corresponding clutch into operation and turns the shaft of the already-operating clutch back into its normal position.

65. In a punching-machine, punching mechanism, a stock-carrier, means including a plurality of clutches to feed said stock-carrier forward, a clutch-actuator, and a plurality of shafts one for each clutch to connect said clutches to the actuator.

66. In a punching-machine, punching mechanism, a stock-carrier, means including a plurality of clutches to feed said stock-carrier forward, a clutch-actuator, a plurality of shafts one for each clutch to connect the clutches to the actuator, and means to operate each clutch at the appropriate time by or through the movement of the stock-carrier.

67. In a punching-machine, punching mechanism, a stock-carrier, means including a plurality of clutches to feed said stock-carrier forward, a clutch-actuator, a plurality of shafts one for each clutch to connect the clutches to the actuator, and automatic means to operate said shafts at the appropriate times.

68. In a punching-machine, punching mechanism, a stock-carrier, means including a plurality of clutches to feed said stock-carrier forward, a clutch-actuator, a plurality of shafts one for each clutch to connect the clutches to the actuator, means to turn each shaft at the appropriate time, and means whereby the throwing of one clutch into operation throws the already-operating clutch out of operation.

69. In a punching-machine, punching mechanism, a stock-carrier, means including a plurality of clutches to feed said stock-carrier forward, a clutch-actuator, a plurality of shafts one for each clutch to connect the clutches to the actuator, automatic means to turn each shaft at the appropriate time, and means whereby the turning of any shaft returns the shaft corresponding to the already-operating clutch back into normal position.

70. In a punching-machine, punching mechanism, a stock-carrier, means including a plurality of clutches to move said stock-carrier forward, a clutch-actuator operated by the punching mechanism, and a plurality of shafts one for each clutch to connect said clutches to the actuator.

71. In a punching-machine, punching mechanism, a stock-carrier, means including a plurality of clutches to move said stock-carrier forward, a clutch-actuator operated by the punching mechanism, a plurality of shafts one for each clutch to connect said clutches to the actuator, and automatic means to operate each shaft at the appropriate time.

72. In a punching-machine, punching mechanism, a stock-carrier, means including a plurality of clutches to move said stock-carrier forward, a clutch-actuator operated by the punching mechanism, a plurality of shafts one for each clutch to connect said clutches to the actuator, means to turn each shaft at the appropriate time, and means whereby the throwing of one clutch into operation throws the already-operating clutch out of operation.

73. In a punching-machine, a plurality of pattern-controlled punches arranged in sets, and a testing-punch coöperating with the punches of each set.

74. In a punching-machine, a plurality of punches arranged in sets, pattern mechanism to control the time of operation of the punches of each set, and a testing-punch for each set controlled by the pattern mechanism.

75. In a punching-machine, a plurality of sets of punches, gags for the punches, gag-operating mechanism comprising a rock-shaft for each set of punches, means connecting the gags of each set of punches to the corresponding rock-shaft, means to operate said shafts, a testing-punch corresponding to each set of punches, and gags for the testing-punches connected to said rock-shafts.

76. In a machine for punching angle-iron, punching mechanism comprising a plurality of punches, combined with a plurality of anvils to support the horizontal flange of each piece of angle-iron, and yielding presser-jaws to engage the vertical flange of each angle-iron.

77. In a punching-machine, a plurality of punches arranged in a line, a stock-carrier, and an alining member extending the length of the line of punches, and by which a plurality of pieces to be punched simultaneously may be alined.

78. In a punching-machine, punching mechanism, driving means therefor, a stock-carrier, a vertically-movable alining member, and means to operate the latter from the driving-shaft.

79. In a punching-machine, punching mechanism, driving means therefor, a stock-carrier, a vertically-movable alining member, means to operate the latter from the driving mechanism, said means including a clutch, and means to automatically disengage the clutch when the alining member has reached either limit of its movement.

In testimony whereof I have signed my name to this specification in the presence of two subscribing witnesses.

CHARLES A. JOHNSON.

Witnesses:
 Louis C. Smith,
 Margaret A. Dunn.